United States Patent
Ide

(10) Patent No.: US 11,619,816 B2
(45) Date of Patent: Apr. 4, 2023

(54) HEAD-MOUNTED DISPLAY

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 194 days.

(21) Appl. No.: 17/004,311

(22) Filed: Aug. 27, 2020

(65) Prior Publication Data

US 2021/0063750 A1 Mar. 4, 2021

(30) Foreign Application Priority Data

Aug. 28, 2019 (JP) .............................. JP2019-156033

(51) Int. Cl.
*G02B 27/01* (2006.01)
*G02B 5/30* (2006.01)

(52) U.S. Cl.
CPC ....... *G02B 27/0172* (2013.01); *G02B 5/3025* (2013.01); *G02B 2027/0107* (2013.01); *G02B 2027/0118* (2013.01); *G02B 2027/0174* (2013.01); *G02B 2027/0178* (2013.01)

(58) Field of Classification Search
CPC ................................. G02B 5/30; G02B 27/288
See application file for complete search history.

(56) References Cited

U.S. PATENT DOCUMENTS

| | | | | | |
|---|---|---|---|---|---|
| 5,572,343 | A | * | 11/1996 | Okamura | G02B 27/0176 349/96 |
| 5,886,823 | A | * | 3/1999 | Sugano | G02B 27/0018 359/630 |
| 5,917,662 | A | * | 6/1999 | Sekita | G02B 17/086 359/729 |
| 6,050,717 | A | * | 4/2000 | Kosugi | G05B 19/409 700/17 |
| 6,097,550 | A | * | 8/2000 | Kimura | G02B 17/0848 359/638 |
| 6,124,986 | A | * | 9/2000 | Sekita | G02B 17/0848 359/691 |
| 6,163,400 | A | * | 12/2000 | Nanba | G02B 17/0694 359/365 |
| 6,301,064 | B1 | * | 10/2001 | Araki | G02B 17/086 359/834 |
| 6,426,841 | B1 | * | 7/2002 | Araki | G02B 17/0848 359/834 |

(Continued)

FOREIGN PATENT DOCUMENTS

CN 109387942 A 2/2019
EP 2896985 A1 * 7/2015 ......... G02B 27/0172

(Continued)

*Primary Examiner* — Fred Tzeng
(74) *Attorney, Agent, or Firm* — Oliff PLC

(57) ABSTRACT

A head-mounted display according to the present disclosure includes an imaging light generating device that emits imaging light, and a half mirror that reflects the imaging light and transmits external light. The imaging light is incident on the half mirror as light of a predetermined polarization state, and, with respect to the light of the predetermined polarization state, reflectance of a first polarization by the half mirror is lower than reflectance of a second polarization by the half mirror.

7 Claims, 16 Drawing Sheets

(56) References Cited

U.S. PATENT DOCUMENTS

| | | | |
|---|---|---|---|
| 2002/0001146 A1* | 1/2002 | Nanba | G02B 27/0101 |
| | | | 359/834 |
| 2011/0075266 A1* | 3/2011 | Oka | G02B 27/0172 |
| | | | 359/630 |
| 2014/0049831 A1* | 2/2014 | Takeda | G02B 27/0172 |
| | | | 359/630 |
| 2017/0343807 A1* | 11/2017 | Anzai | G02B 5/26 |
| 2018/0151194 A1 | 5/2018 | Noguchi | |
| 2018/0299676 A1* | 10/2018 | Lee | G02B 27/28 |
| 2019/0235266 A1 | 8/2019 | Ide et al. | |
| 2020/0041785 A1* | 2/2020 | Takagi | G02B 27/288 |
| 2020/0041795 A1* | 2/2020 | Yamaguchi | G02B 3/08 |
| 2020/0064592 A1* | 2/2020 | Tashiro | G02B 27/0025 |
| 2020/0089002 A1* | 3/2020 | Lee | G02B 5/30 |

FOREIGN PATENT DOCUMENTS

| | | | | |
|---|---|---|---|---|
| JP | 2018-087949 A | | 6/2018 | |
| JP | 2018205448 A | * | 12/2018 | G02B 27/0172 |
| JP | 2019-133132 A | | 8/2019 | |

\* cited by examiner

HEAD-MOUNTED DISPLAY

The present application is based on, and claims priority from JP Application Serial Number 2019-156033, filed Aug. 28, 2019, the disclosure of which is hereby incorporated by reference herein in its entirety.

BACKGROUND

1. Technical Field

The present disclosure relates to a head-mounted display.

2. Related Art

As a display device including a diffraction element such as a holographic element, a display device is conceivable in which imaging light emitted from an imaging light generating device is deflected toward an eye of an observer by the diffraction element. Interference fringes are optimized in the diffraction element to obtain an optimum diffraction angle and optimum diffraction efficiency at a specific wavelength. However, the imaging light has a predetermined spectral width centered at the specific wavelength, and thus, light of a peripheral wavelength deviated from the specific wavelength may cause a deterioration in resolution of an image. Thus, a display device is conceivable in which the imaging light emitted from the imaging light generating device is directed by a reflective-type first diffraction element toward a second diffraction element disposed in front of the first diffraction element, and in which the second diffraction element deflects the imaging light emitted from the first diffraction element toward the eye of the observer. According to this configuration, the first diffraction element can perform wavelength compensation, and the deterioration in the resolution of the image due to the light having a wavelength deviated from a specific wavelength can be suppressed (refer to JP-A-2018-087949, for example). In the technology described above, a mirror is provided between the two diffraction elements to guide the imaging light.

In the technology disclosed in JP-A-2018-087949, it is conceivable to increase a range over which an external scene can be viewed by configuring the mirror that is disposed between the two diffraction elements using a half mirror that guides the imaging light. However, there is a risk that the imaging light incident on the half mirror is transmitted without being reflected, and may become visible to a third party on the outside.

SUMMARY

In order to solve the above-described problem, a head-mounted display according to a first aspect of the present disclosure includes an imaging light generating device configured to emit imaging light, and a half mirror configured to reflect the imaging light and transmit external light. The imaging light is incident on the half mirror as light of a predetermined polarization state, and, with respect to the light of the predetermined polarization state, reflectance of a first polarization by the half mirror is lower than reflectance of a second polarization by the half mirror.

In the first aspect, the head-mounted display may be configured to include a polarization conversion member provided on an optical path of the imaging light between the imaging light generating device and the half mirror, and configured to convert a polarization state of the imaging light to the second polarization.

In the first aspect, the polarization conversion member may be configured by one of a wave plate, a polarization film, or a polarization membrane.

In the first aspect, the head-mounted display may be configured to include a polarization absorbing film provided on an opposite side of the half mirror from a reflection surface thereof, and configured to absorb the first polarization.

In the first aspect, the head-mounted display may be configured to include a first optical unit having positive power, a second optical unit including a reflective first diffraction element and having positive power, a third optical unit having positive power, and fourth optical unit including a reflective second diffraction element and having positive power, with the first to fourth optical units being provided along an optical path of the imaging light emitted from the imaging light generating device, wherein the third optical unit may include the half mirror.

In the first aspect, the head-mounted display may be configured to include a frame configured to support the half mirror. The frame may support the half mirror to be in a position in a static visual field of an observer observing the imaging light.

A head-mounted display according to a second aspect of the present disclosure includes an imaging light generating device configured to emit imaging light, at least one optical member configured to deflect a traveling direction of the imaging light and to transmit external light, and a polarization absorbing film provided on an opposite side of the optical member from a light incident surface thereof, and configured to absorb a first polarization. The imaging light is incident on the optical member as light of a predetermined polarization state including at least the first polarization.

In the second aspect, the head-mounted display may be configured to include a first optical unit having positive power, a second optical unit including a reflective first diffraction element and having positive power, a third optical unit having positive power, and a fourth optical unit including a reflective second diffraction element and having positive power, with the first to fourth optical units being provided along an optical of the imaging light emitted from the imaging light generating device, wherein at least one of the third optical unit and the fourth optical unit may include the optical member.

In the second aspect, the head-mounted display may be configured to include a frame configured to support the optical member. The frame may support the optical member to be in a position in a static visual field of an observer observing the imaging light.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
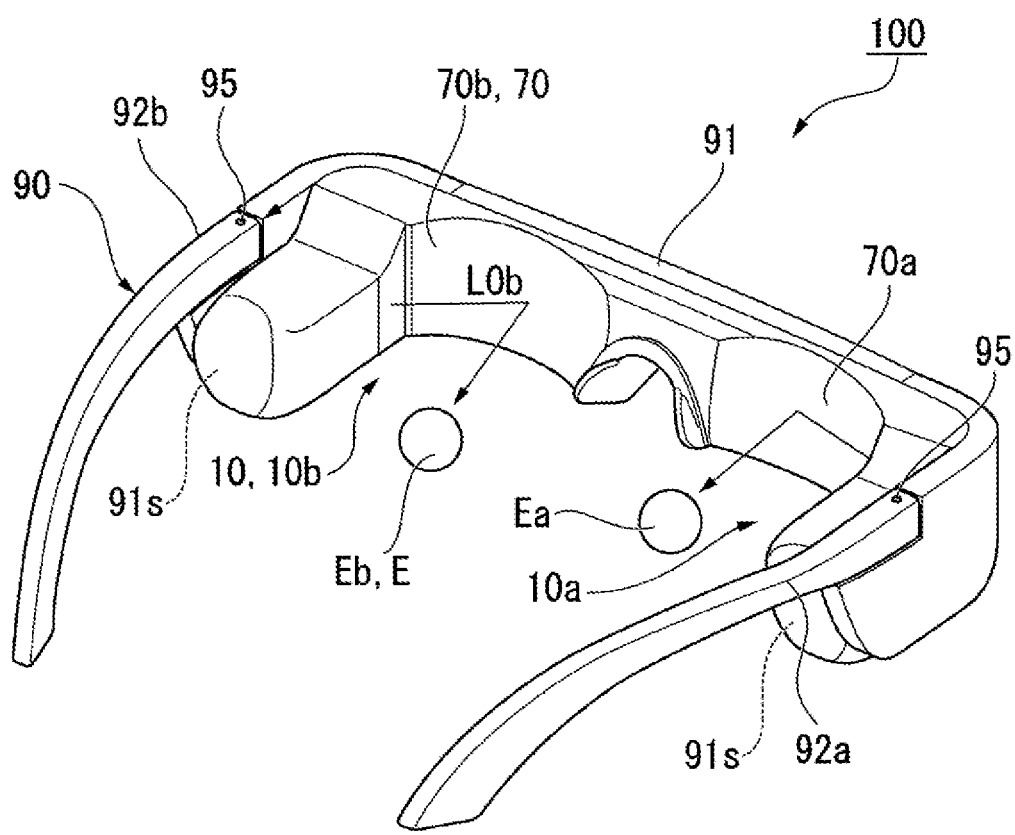
FIG. 1 is an external view illustrating an aspect of an external appearance of a display device according to a first exemplary embodiment.
Figure 1:
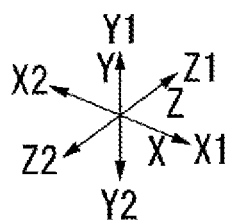
Figure 2:
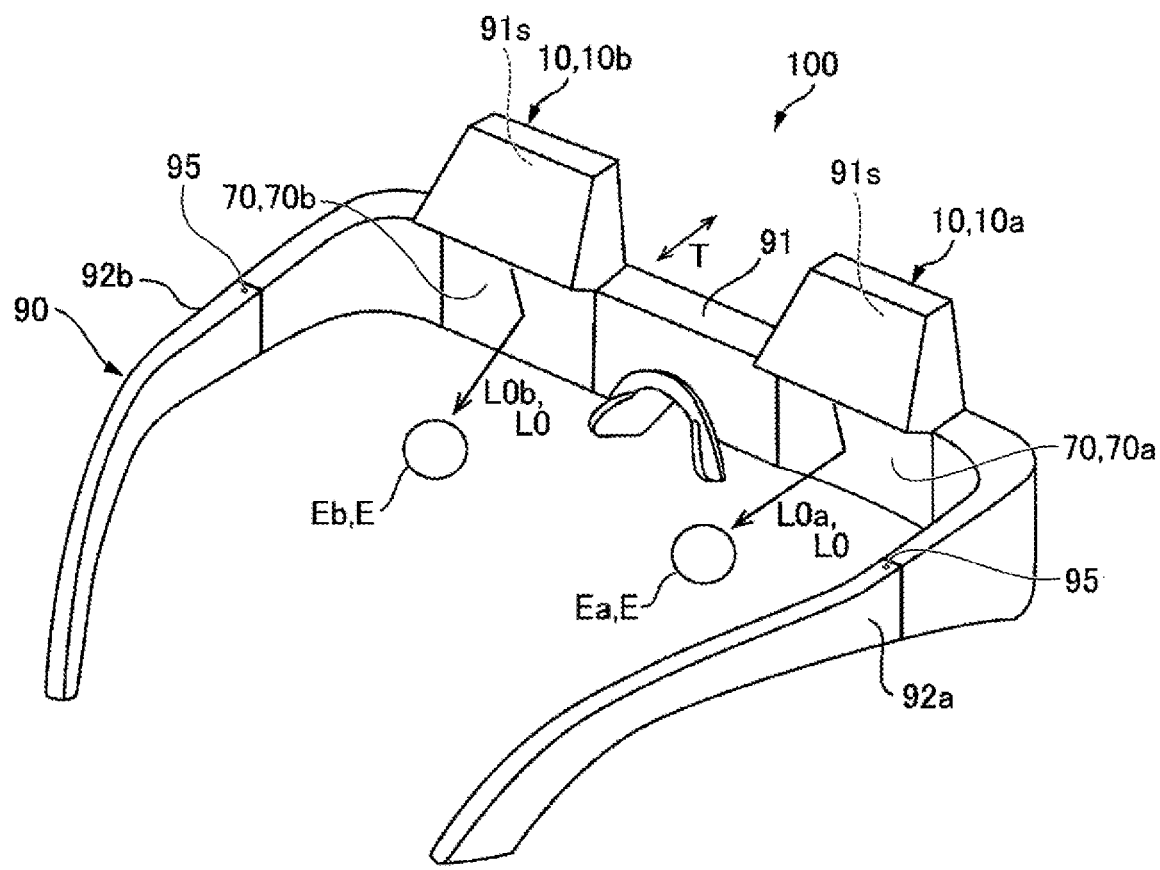
FIG. 2 is an external view illustrating another aspect of the external appearance of the display device.
Figure 2:
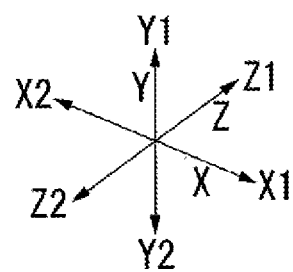
Figure 3:
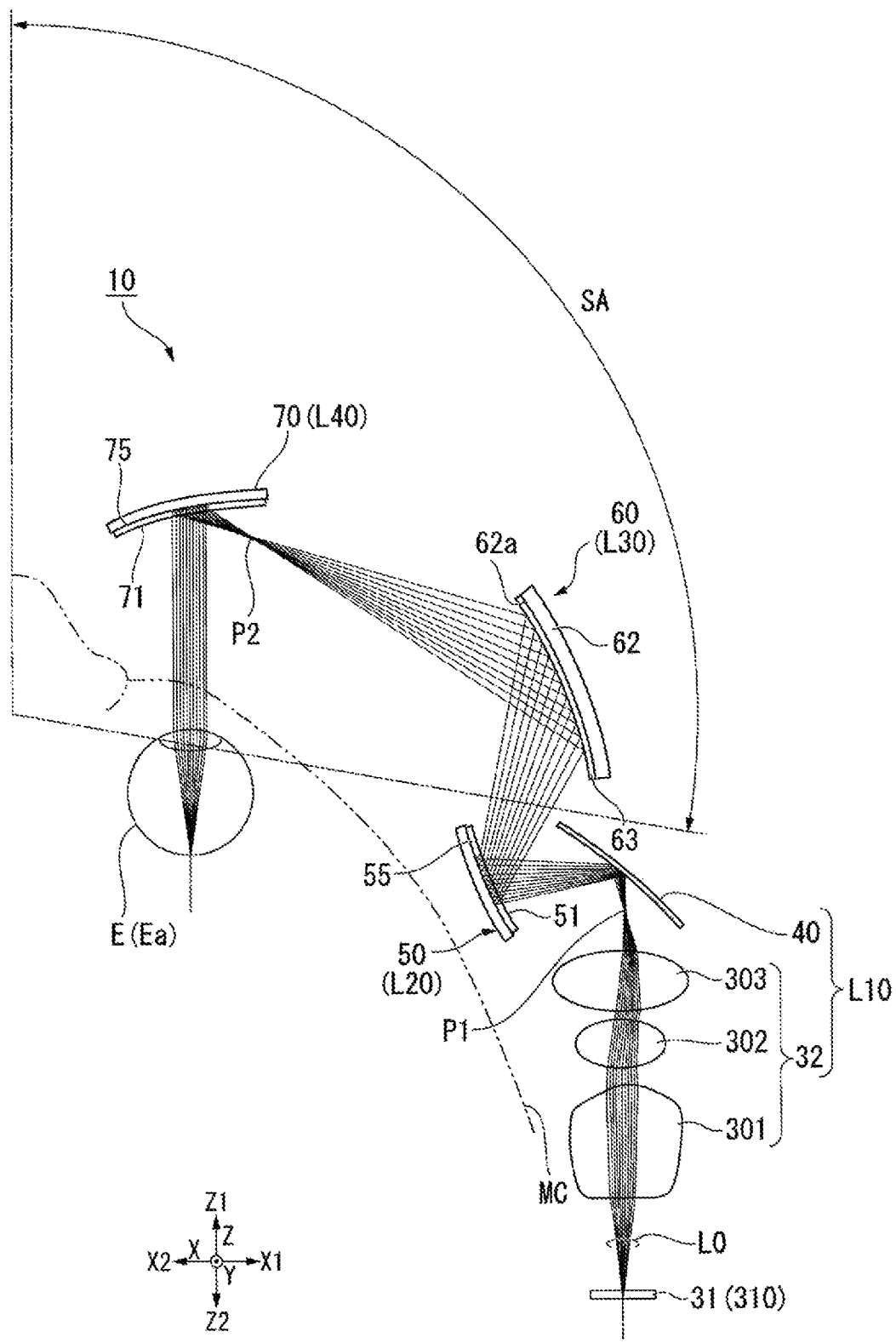
FIG. 3 is an explanatory diagram illustrating an aspect of an optical system of the display device.

FIG. 1 is an external view illustrating an aspect of an external appearance of a display device 100 according to the present exemplary embodiment. The display device 100 illustrated in FIG. 1 is a head-mounted display (HMD) configured to be mounted on a head of a user. FIG. 2 is an external view illustrating another aspect of the external appearance of the display device 100. FIG. 3 is an explanatory diagram illustrating an aspect of an optical system 10 of the display device 100 illustrated in FIG. 1. Note that, in FIG. 1 to FIG. 3, a front-back direction relative to an observer wearing the display device is referred to as a direction along a Z axis, an area in front of the observer wearing the display device, which is one side in the front-back direction, is referred to as a front side Z1, and an area to the rear of the observer wearing the display device, which is the other side in the front-back direction, is referred to as a rear side Z2. Further, a left-right direction with respect to the observer wearing the display device is defined as a direction along an X axis, one side in the left-right direction corresponding to the rightward direction of the observer wearing the display device is defined as a right side X1, and the other side in the left-right direction corresponding to the leftward direction of the observer wearing the display device is defined as a left side X2. Further, an up-down direction with respect to the observer wearing the display device is defined as a direction along a Y axis, one side in the up-down direction corresponding to the upward direction of the observer wearing the display device is defined as an up side Y1, and the other side in the up-down direction corresponding to the downward direction of the observer wearing the display device is defined as a down side Y2.

As illustrated in FIG. 1, the display device 100 includes a right-eye optical system 10a that causes imaging light L0a to be incident on a right eye Ea and a left-eye optical system 10b that causes imaging light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted on the head of the observer using the housing 90.

In the display device 100, the housing 90 includes a frame 91, a temple 92a provided on the right side of the frame 91 and locked on the right ear of the observer, and a temple 92b provided on the left side of the frame 91 and locked on the left ear of the observer. The frame 91 includes storage spaces 91s on both sides of the frame 91, and the storage spaces 91s house components, such as an imaging light projecting device, that configure the optical system 10 described below. The temples 92a and 92b are foldably coupled to the frame 91 by hinges 95.

The right-eye optical system 10a and the left-eye optical system 10b have the same basic configuration. Therefore, the right-eye optical system 10a and the left-eye optical system 10b will be described as the optical system 10 without distinction in the description below.

Further, in the display device 100 illustrated in FIG. 1, imaging light L0 is caused to travel in the left-right direction along the X axis. However, as illustrated in FIG. 2, the imaging light L0 may be caused to travel from the up side Y1 to the down side Y2 and enter eyes E of the observer, or the optical system 10 may be disposed to cover an area from the top of the head to the front of the eyes E.

A basic configuration of the optical system 10 of the display device 100 will be described with reference to FIG. 3. FIG. 3 is a schematic diagram illustrating an aspect of the optical system 10 of the display device 100 illustrated in FIG. 1.

As illustrated in FIG. 3, in the optical system 10, a first optical unit L10 having positive power, a second optical unit L20 having positive power, a third optical unit L30 having positive power, and a fourth optical unit L40 having positive power are arranged along an optical path direction of the imaging light L0 emitted from the imaging light generating device 31.

In the optical system 10, when focusing on a traveling direction of the imaging light L0, the imaging light generating device 31 emits the imaging light L0 toward a projection optical system 32, and the projection optical system 32 emits the incident imaging light L0 toward a mirror 40. The mirror 40 includes a reflection surface 40a and reflects the imaging light L0 toward a first diffraction element 50. The imaging light L0 reflected by the reflection surface 40a of the mirror 40 is incident on the first diffraction element 50. The imaging light L0 diffracted by the first diffraction element 50 is emitted toward a light guiding system 60. The light guiding system 60 emits the incident imaging light L0 toward a second diffraction element 70, and the second diffraction element 70 emits the incident imaging light L0 toward the eye E of the observer.

In the present exemplary embodiment, the imaging light generating device 31 generates the imaging light L0.

The imaging light generating device 31 includes a display panel 310 that modulates light emitted from a backlight (not illustrated), using a liquid crystal display element. The display panel 310 includes a polarizing plate on the light emission side. Thus, the imaging light L0 emitted from the display panel 310 is caused to be in a predetermined polarization state. Specifically, the imaging light L0 emitted from the display panel 310 is linearly polarized light.

The projection optical system 32 is an optical system configured to project the imaging light L0 generated by the imaging light generating device 31, and includes a first lens 301, a second lens 302, and a third lens 303. The first lens 301, the second lens 302, and the third lens 303 are each configured by a free-form surface lens or a rotationally symmetric lens. The projection optical system 32 may be an eccentric optical system. In the example in FIG. 3, the projection optical system 32 includes the three lenses, but the number of lenses is not limited to three, and the projection optical system 32 may include five or more lenses. The lenses may be stuck together to form the projection optical system 32.

The light guiding system 60 includes a half mirror 62 with a reflection surface 62a that is more recessed at the center than at peripheral portions. The light guiding system 60 has positive power. The reflection surface 62a is formed by a spherical surface, an aspherical surface, a free-form surface, or the like. In the present exemplary embodiment, the half mirror 62 is a mirror including the reflection surface 62a formed by a free-form surface. The half mirror 62 configuring the light guiding system 60 is supported by the frame 91 (see FIG. 1) so as to be positioned within a static visual field SA of an observer MC. Here, the static visual field SA corresponds to a viewing angle when viewing straight ahead, and an angular range of a single eye (the right eye Ea) in the static visual field SA is 100 degrees, as illustrated in FIG. 3. In the optical system 10 of the present exemplary embodiment, the light guiding system 60 positioned within the static visual field SA is configured by the half mirror 62. Therefore, a wide range of visible external light can be secured.

Next, a configuration of the first diffraction element 50 and the second diffraction element 70 will be described.

In the present exemplary embodiment, the first diffraction element 50 and the second diffraction element 70 have the same basic configuration. Hereinafter, a configuration of the second diffraction element 70 will be described as an example.

Figure 4A:
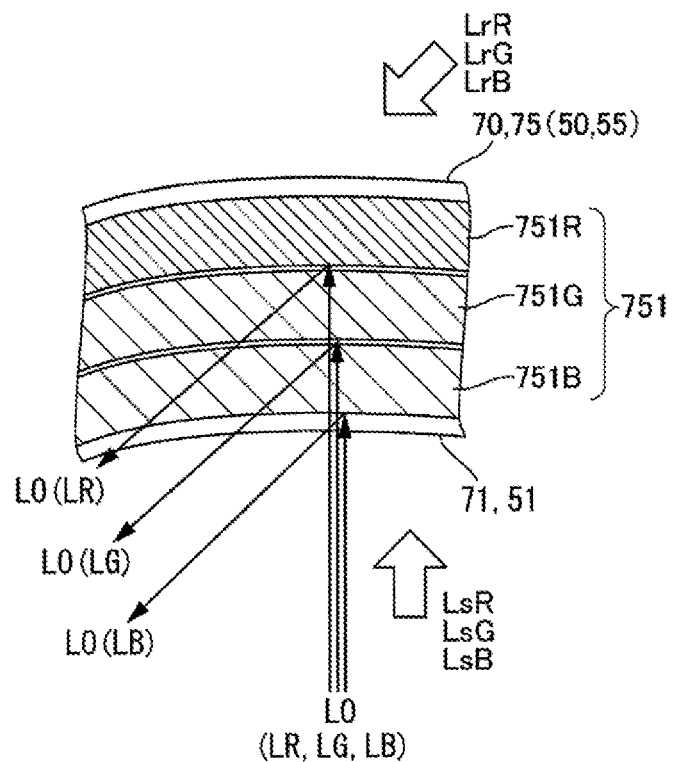
FIG. 4A is an explanatory diagram of interference fringes of a diffraction element.

FIG. 4A is a schematic diagram of interference fringes 751 of the second diffraction element 70 illustrated in FIG. 3. In FIG. 4A, the second diffraction element 70 includes a reflective volume holographic element 75 that is a partially reflective diffraction optical element. Thus, the second diffraction element 70 configures a partially transmissive/reflective combiner. Therefore, external light is also incident on the eye E via the second diffraction element 70, and thus the observer can recognize an image in which the imaging light L0 formed by the imaging light generating device 31 and the external light (background) are superimposed on each other.

The second diffraction element 70 faces the eye E of the observer. An incident surface 71 of the second diffraction element 70 on which the imaging light L0 is incident has a concave surface being recessed in a direction away from the eye E. In other words, in the incident direction of the imaging light L0, the incident surface 71 has a curved shape that is more recessed at the center than at peripheral portions. Thus, the imaging light L0 can be efficiently condensed toward the eye E of the observer.

The second diffraction element 70 includes the interference fringes 751 with a pitch corresponding to a specific wavelength. The interference fringes 751 are recorded as a difference in refractive index and the like in a hologram photosensitive layer. The interference fringes 751 are inclined in one direction with respect to the incident surface 71 of the second diffraction element 70 so as to correspond to a specific incident angle. Therefore, the second diffraction element 70 diffracts and deflects the imaging light L0 in a predetermined direction. The specific wavelength and the specific incident angle respectively correspond to a wavelength and an incident angle of the imaging light L0. The interference fringes 751 of this configuration can be formed by performing interference exposure on the holographic photosensitive layer using reference light Lr and object light Ls.

In the present exemplary embodiment, the imaging light L0 is for color display. Thus, the second diffraction element 70 includes interference fringes 751R, 751G, and 751B each having a pitch corresponding to the specific wavelength. For example, the interference fringes 751R are formed at a pitch corresponding to red imaging light LR with a wavelength of 615 nm included in a wavelength range from 580 nm to 700 nm. The interference fringes 751G are formed, for example, at a pitch corresponding to green light LG with a wavelength of 535 nm included in a wavelength range from 500 nm to 580 nm. The interference fringes 751B are formed, for example, at a pitch corresponding to blue light LB with a wavelength of 460 nm included in a wavelength range from 400 nm to 500 nm. The above configuration can be formed by forming a holographic photosensitive layer having sensitivity corresponding to the respective wavelengths, and performing interference exposure on the holographic photosensitive layer using reference light LrR, LrG, and LrB and object light LsR, LsG, and LsB of the respective wavelengths.

Figure 4B:
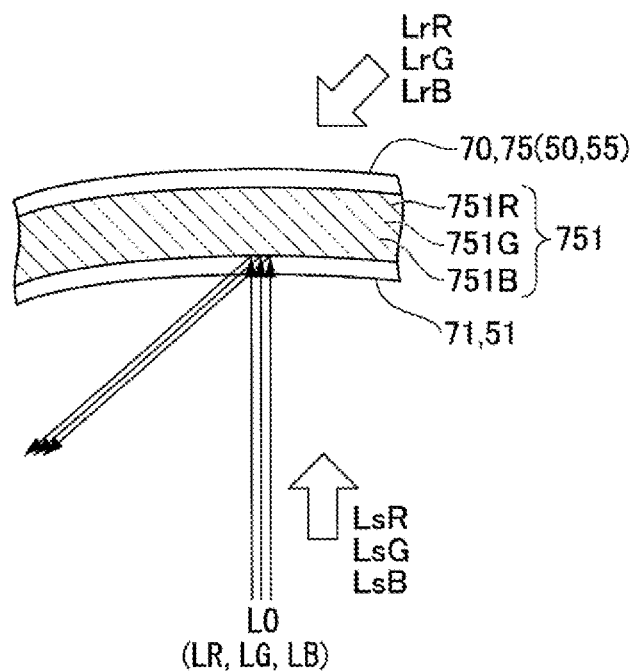
FIG. 4B is an explanatory diagram of another form of interference patterns of the diffraction element.

Note that the interference fringes 751 including the interference fringes 751R, 751G, and 751B superimposed on one another in one layer, as illustrated in FIG. 4B, may be formed by dispersing a photosensitive material having sensitivity corresponding to the respective wavelengths in the holographic photosensitive layer and then performing interference exposure on the holographic photosensitive layer using the reference light LrR, LrG, and LrB and the object light LsR, LsG, and LsB of the respective wavelengths.

Further, spherical wave light may be used as the reference light LrR, LrG, and LrB and the object light LsR, LsG, and LsB.

The first diffraction element 50 with the same basic configuration as the second diffraction element 70 is provided with a reflective volume holographic element 55. An incident surface 51 of the first diffraction element 50 on which the image light L0 is incident has a recessed concave surface. In other words, in the incident direction of the image light L0, the incident surface 51 has a curved shape that is more recessed at the center than at peripheral portions. Thus, the image light L0 can be efficiently deflected toward the light guiding system 60.

Figure 5:
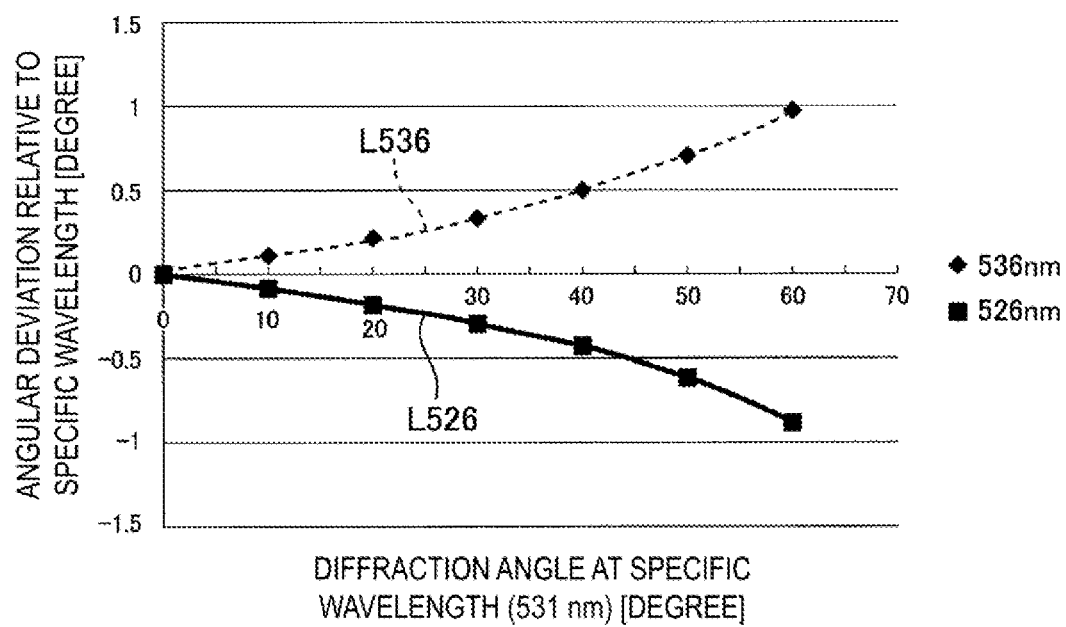
FIG. 5 is an explanatory diagram of diffraction characteristics of a volume hologram configuring a first diffraction element and a second diffraction element.

FIG. 5 is a schematic diagram illustrating diffraction characteristics of the first diffraction element 50 and the second diffraction element 70 illustrated in FIG. 3. FIG. 5 illustrates a difference in diffraction angles between a specific wavelength and a peripheral wavelength when light rays are incident on one point on the volume hologram. In FIG. 5, when the specific wavelength is 531 nm, a deviation in the diffraction angle of light with a peripheral wavelength of 526 nm is indicated by a solid line L526, and a deviation in the diffraction angle of light with a peripheral wavelength of 536 nm is indicated by a dashed line L536. As illustrated in FIG. 5, even when light rays are incident on the same interference fringe recorded in the hologram, a light ray with a longer wavelength is more significantly diffracted, and a light ray with a shorter wavelength is less likely to diffracted. Thus, when two diffraction elements, namely, the first diffraction element 50 and the second diffraction element 70 are used, as in the present exemplary embodiment, proper wavelength compensation cannot be achieved unless consideration is given to the ray angles of incident light with wavelengths both larger and smaller than the specific wavelength. In other words, color aberration occurring in the second diffraction element 70 cannot be canceled. Further, since the angle of diffraction varies depending on the number of interference fringes, interference fringes need to be taken into account.

In the optical system 10 illustrated in FIG. 3, as described in JP-A-2017-167181, wavelength compensation, namely, color aberration cancellation can be achieved because the incident direction and the like with respect to the second diffraction element 70 is made appropriate in accordance with whether a sum of the number of times of formation of an intermediate image between the first diffraction element 50 and the second diffraction element 70 and the number of times of reflection by the half mirror 62 is odd or even.

Figure 6:
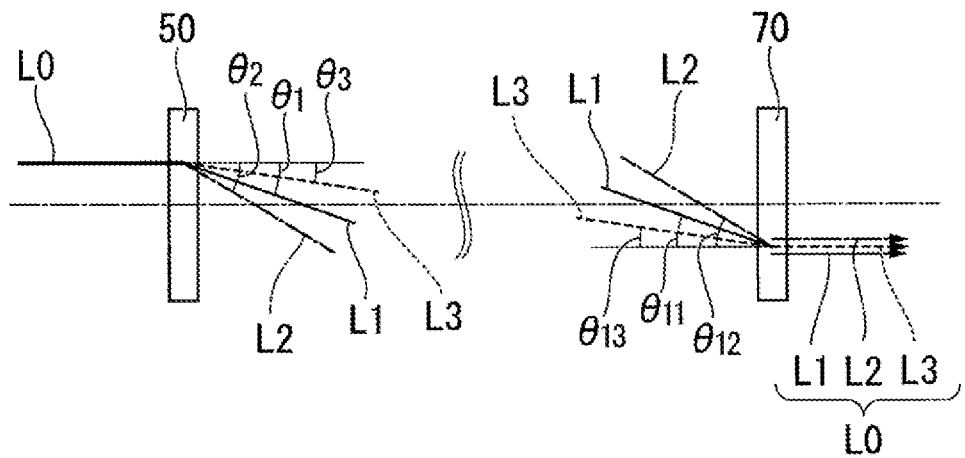
FIG. 6 is an explanatory diagram of the principle of cancellation of color aberration occurring at the second diffraction element.

FIG. 6 is a diagram illustrating the principle of cancellation of color aberration occurring in the second diffraction element 70. Note that, in addition to light L1 (solid lines) with the specific wavelength of the imaging light L0, FIG. 6 also illustrates light L2 (dot-and-dash lines) on a long wavelength side and light L3 (dotted lines) on a short wavelength side with respect to the specific wavelength.

Specifically, the imaging light L0 incident on the first diffraction element 50 is deflected by being diffracted by the first diffraction element 50, as illustrated in FIG. 6. At this time, the light L2 on the long wavelength side with respect to the specific wavelength has a diffraction angle θ2 greater than a diffraction angle θ1 of the light L1 having the specific wavelength. Further, the light L3 on the short wavelength side with respect to the specific wavelength has a diffraction angle θ3 smaller than the diffraction angle θ1 of the light L1 having the specific wavelength. Therefore, the imaging light L0 emitted from the first diffraction element 50 is deflected and dispersed at each of the wavelengths.

The imaging light L0 emitted from the first diffraction element 50 is incident on the second diffraction element 70 via the light guiding system 60 and is then diffracted and deflected by the second diffraction element 70. At this time, on the optical path from the first diffraction element 50 to the second diffraction element 70, an intermediate image is formed once, and reflection by the half mirror 62 is performed once. Therefore, when the incident angle is defined as an angle between the imaging light L0 and a normal line of an incident surface of the second diffraction element 70, the light L2 on the long wavelength side with respect to the specific wavelength has an incident angle θ12 larger than an incident angle θ11 of the light L1 with the specific wavelength, and the light L3 on the short wavelength side with respect to the specific wavelength has an incident angle θ13 smaller than the incident angle θ11 of the light L1 with the specific wavelength. Further, as described above, the light L2 on the long wavelength side with respect to the specific wavelength has the diffraction angle θ2 greater than the diffraction angle θ1 of the light L1 having the specific wavelength. The light L3 on the short wavelength side with respect to the specific wavelength has the diffraction angle θ3 smaller than the diffraction angle θ1 of the light L1 having the specific wavelength.

Therefore, the light L2 on the long wavelength side with respect to the specific wavelength is incident on the first diffraction element 50 at a larger incident angle than the light L1 with the specific wavelength. However, the diffraction angle of the light L2 on the long wavelength side with respect to the specific wavelength is larger than the diffraction angle of the light L1 with the specific wavelength, and as a result, the light L2 on the long wavelength side with respect to the specific wavelength and the light L1 with the specific wavelength are substantially parallel when emitted from the second diffraction element 70. In contrast, the light L3 on the short wavelength side with respect to the specific wavelength is incident on the first diffraction element 50 at a smaller incident angle than the light L1 with the specific wavelength. However, the diffraction angle of the light L3 on the short wavelength side with respect to the specific wavelength is smaller than the diffraction angle of the light L1 with the specific wavelength, and as a result, the light L3 on the short wavelength side with respect to the specific wavelength and the light L1 with the specific wavelength are substantially parallel when emitted from the second diffraction element 70. Accordingly, as illustrated in FIG. 6, the imaging light L0 emitted from the second diffraction element 70 is incident on the eye E of the observer as substantially parallel light, thus suppressing a shift in an imaging position on a retina E0 at each of the wavelengths. Accordingly, the color aberration occurring in the second diffraction element 70 can be canceled.

Now, a conjugate relationship between the first diffraction element 50 and the second diffraction element 70 will be described.

Figure 7A:
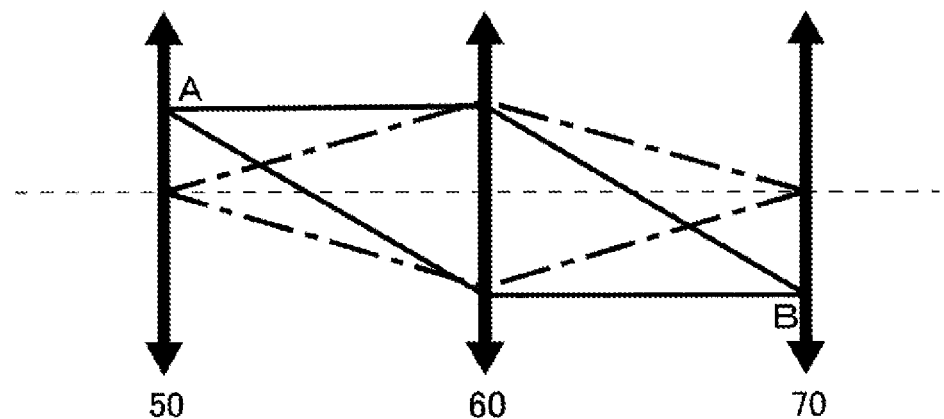
FIG. 7A is an explanatory diagram illustrating a case in which the first and second diffraction elements are in a conjugate relationship.
Figure 7B:
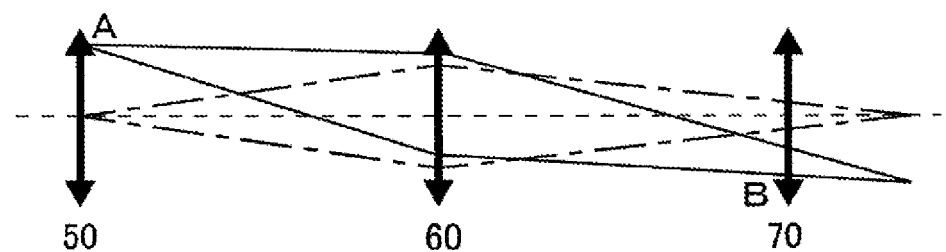
FIG. 7B is an explanatory diagram illustrating a case in which the first and second diffraction elements are not in the conjugate relationship.
Figure 7C:
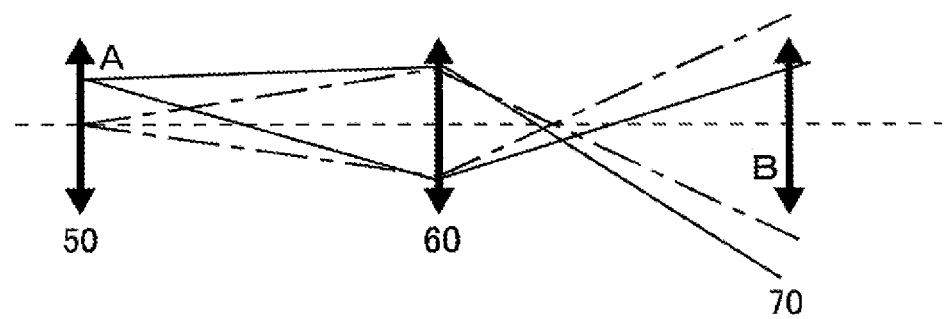
FIG. 7C is an explanatory diagram illustrating a case in which the first and second diffraction elements are not in the conjugate relationship.
Figure 8A:
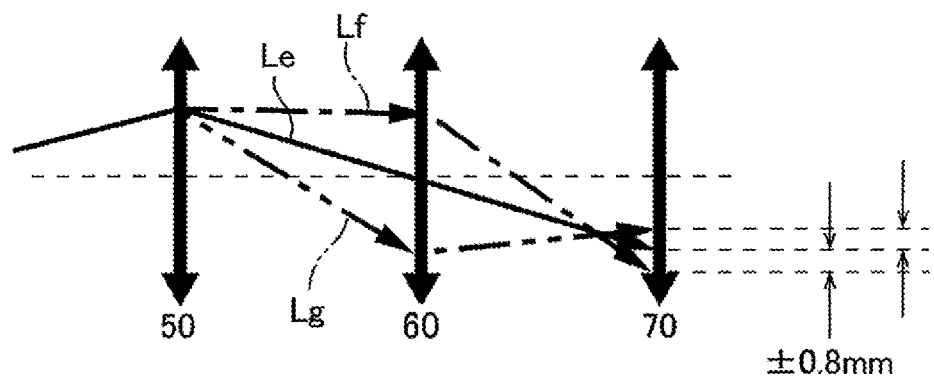
FIG. 8A is an explanatory diagram illustrating a tolerance for deviation from the conjugate relationship between the first and second diffraction elements.
Figure 8B:
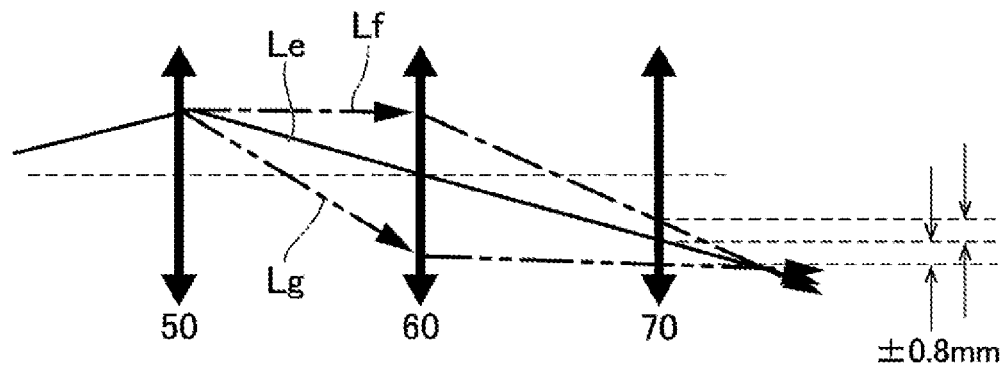
FIG. 8B is an explanatory diagram of another form illustrating a tolerance for deviation from the conjugate relationship between the first and second diffraction elements.

FIG. 7A is an explanatory diagram of a case in which the first diffraction element 50 and the second diffraction element 70 are in the conjugate relationship. FIG. 7B and FIG. 7C are explanatory diagrams of cases in which the first diffraction element 50 and the second diffraction element 70 are not in the conjugate relationship. FIG. 8A and FIG. 8B are explanatory diagrams illustrating a tolerance for deviation from the conjugate relationship between the first diffraction element 50 and the second diffraction element 70 illustrated in FIG. 7B and FIG. 7C. In FIG. 8A and FIG. 8B, the light with the specific wavelength is indicated by a solid line Le, light with a wavelength shorter than the specific wavelength by −10 nm is indicated by a dot-dash line Lf, and light with a wavelength longer than the specific wavelength by +10 nm is indicated by a two-dot chain line Lg. Note that, in FIG. 7A to FIG. 7C, and FIG. 8A and FIG. 8B, for ease of understanding the passage of the light, the first diffraction element 50, the second diffraction element 70, and the light guiding system 60 are illustrated as transmissive-type and are indicated by arrows.

As illustrated in FIG. 7A, when the first diffraction element 50 and the second diffraction element 70 are in the conjugate relationship, divergent light rays emitted from a point A (a first position) of the first diffraction element 50 are condensed by the light guiding system 60 having positive power, and are incident at a point B (a second position corresponding to the first position) of the second diffraction element 70. Therefore, color aberration caused by diffraction occurring at the point B can be compensated for at the point A.

In contrast, as illustrated in FIG. 7B and FIG. 7C, when the first diffraction element 50 and the second diffraction element 70 are not in the conjugate relationship, the divergent light rays emitted from the point A of the first diffraction element 50 are condensed by the light guiding system 60 that is centrally located and has positive power, and intersect with each other and are incident at a position beyond the point B on the second diffraction element 70 or at a point between the first diffraction element 50 and the point B. Thus, the point A and the point B are not in a one-to-one relationship. Here, since a compensation effect increases when the interference fringes are uniform within a region, the compensation effect decreases when the first diffraction element 50 and the second diffraction element 70 are not in the conjugate relationship. On the other hand, it is difficult to compensate for the entire projection region of the second diffraction element 70 using the first diffraction element 50. Therefore, in the aspects illustrated in FIG. 7B and FIG. 7C, sufficient wavelength compensation cannot be achieved, and thus a deterioration in resolution occurs.

Note that with respect to the light of the wavelengths longer and shorter than the specific wavelength by ±10 nm, there is an error of approximately ±0.4 mm from the point B at which the light with the specific wavelength arrives, but the deterioration in resolution is not noticeable. Results of examination of such a permissible range indicate that, as illustrated in FIG. 8A, the deterioration in the resolution is not noticeable when the light rays with the specific wavelength intersect each other at a point between the first diffraction element 50 and the point B on the second diffraction element 70, and are incident in a range of ±0.8 mm from the point B, which corresponds to an ideal point at which the light with the specific wavelength arrives. Further, as illustrated in FIG. 8B, the deterioration in the resolution is not noticeable when the light rays of the specific wavelength intersect each other at a point beyond the point B on the second diffraction element 70, and are incident in the range of ±0.8 mm from the point B, which corresponds to the ideal point at which the light with the specific wavelength arrives. Therefore, even when the first diffraction element 50 and the second diffraction element 70 are not in the complete conjugate relationship, the deterioration in the resolution can be tolerated when the first diffraction element 50 and the second diffraction element 70 are in a substantially conjugate relationship and the light rays arrive within the range of ±0.8 mm from the ideal point B. In other words, in the present exemplary embodiment, the conjugate relationship between the first diffraction element 50 and the second diffraction element 70 means that the incident position of the light of the specific wavelength has an error range of ±0.8 mm from the ideal incident point.

Figure 9:
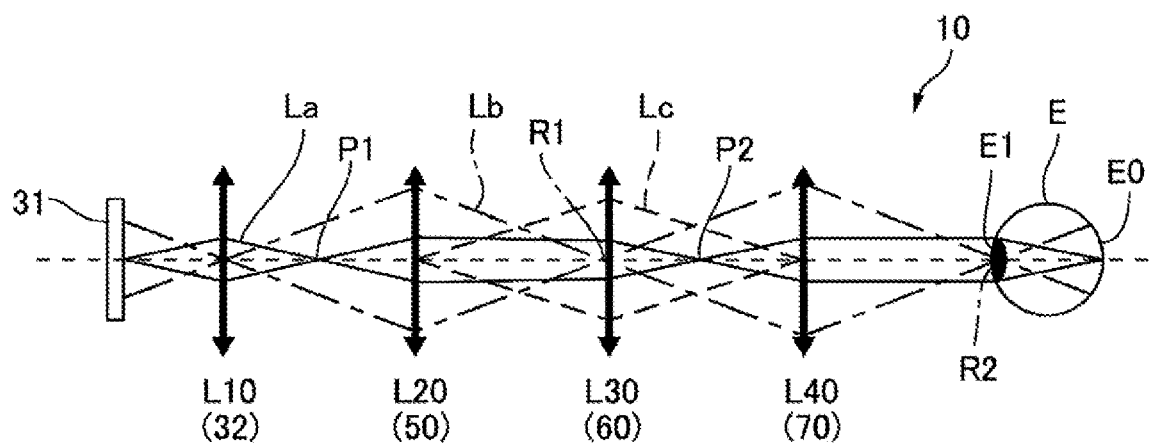
FIG. 9 is a diagram illustrating light rays in an optical system.

FIG. 9 is a diagram of light rays in the optical system 10 of the present exemplary embodiment. In FIG. 9, each of the optical units disposed along an optical axis is indicated by a thick arrow. Further, light rays emitted from one pixel of the imaging light generating device 31 are indicated by solid lines La, principal light rays emitted from the imaging light generating device 31 are indicated by dot-and-dash lines Lb, and long dashed lines Lc indicate a position that has a conjugate relationship with the first diffraction element 50. Here, "intermediate image" refers to a position at which the light rays (the solid lines La) emitted from one pixel converge, and "pupil" refers to a position at which the principal light rays (the dot-and-dash lines Lb) of each angle of view converge. FIG. 9 illustrates the passage of the light emitted from the imaging light generating device 31. Note that, in FIG. 9, all of the optical units are illustrated as the transmissive-type in order to simplify the drawing.

As illustrated in FIG. 9, in the optical system 10 of the present exemplary embodiment, the first optical unit L10 having positive power, the second optical unit L20 having positive power and provided with the first diffraction element 50, the third optical unit L30 having positive power, and the fourth optical unit L40 having positive power and provided with the second diffraction element 70 are provided along the optical path of the imaging light emitted from the imaging light generating device 31.

A focal length of the first optical unit L10 is L/2. Focal lengths of the second optical unit L20, the third optical unit L30, and the fourth optical unit L40 are all L. Therefore, an optical distance from the second optical unit L20 to the third optical unit L30 is equal to an optical distance from the third optical unit L30 to the fourth optical unit L40.

In such an optical system 10, a first intermediate image P1 of the imaging light is formed between the first optical unit L10 and the third optical unit L30, a pupil R1 is formed between the second optical unit L20 and the fourth optical unit L40, a second intermediate image P2 of the imaging light is formed between the third optical unit L30 and the fourth optical unit L40, and the fourth optical unit L40 collimates the imaging light to form an exit pupil R2. At this time, the third optical unit L30 freely controls the imaging light emitted from the second optical unit L20, and causes the imaging light to enter the fourth optical unit L40 as divergent light, convergent light, or parallel light. The second optical unit L20 causes the imaging light emitted from the first optical unit L10 to be incident as convergent light on the third optical unit L30. In the optical system 10 according to the present exemplary embodiment, the pupil R1 is formed in the vicinity of the third optical unit L30 between the second optical unit L20 and the fourth optical unit L40. The vicinity of the third optical unit L30 refers to a position, between the second optical unit L20 and the third optical unit L30, that is closer to the third optical unit L30 than to the second optical unit L20, or a position, between the third optical unit L30 and the fourth optical unit L40, that is closer to the third optical unit L30 than to the fourth optical unit L40.

For the imaging light from one point of the imaging light generating device 31, the third optical unit L30 causes light with a peripheral wavelength deviated from the specific wavelength due to deflection by the first diffraction element 50 to enter a predetermined range of the second diffraction element 70. In other words, the first diffraction element 50 and the second diffraction element 70 are in the conjugate relationship or the substantially conjugate relationship.

Here, an absolute value of magnification of projection on the second diffraction element 70 by the third optical unit L30 of the first diffraction element 50 ranges from 0.5 times to 10 times, and the absolute value of such a magnification preferably ranges from 1 time to 5 times.

Thus, according to the optical system 10 of the present exemplary embodiment, the first intermediate image P1 of the imaging light is formed between the projection optical system 32 and the light guiding system 60, the pupil R1 is formed in the vicinity of the light guiding system 60, the second intermediate image P2 of the imaging light is formed between the light guiding system 60 and the second diffraction element 70, and the second diffraction element 70 collimates the imaging light to form the exit pupil R2.

In the optical system 10 according to the present exemplary embodiment, the first intermediate image P1 is formed between the first optical unit L10 (the projection optical system 32) and the second optical unit L20 (the first diffraction element 50).

Here, as described above, in the optical system 10 according to the present exemplary embodiment, by using a light-transmissive half mirror as the half mirror 62 that configures the light guiding system 60, a wide range of visible external light is secured. However, it is very difficult to achieve the half mirror 62 that reflects all of the light incident from the second optical unit L20 toward the fourth optical unit L40 while transmitting the external light. As a result, there is a risk that a portion of the imaging light L0 may be transmitted through the half mirror 62 and that the image being viewed by the observer may become visible to a third party.

Figure 10:
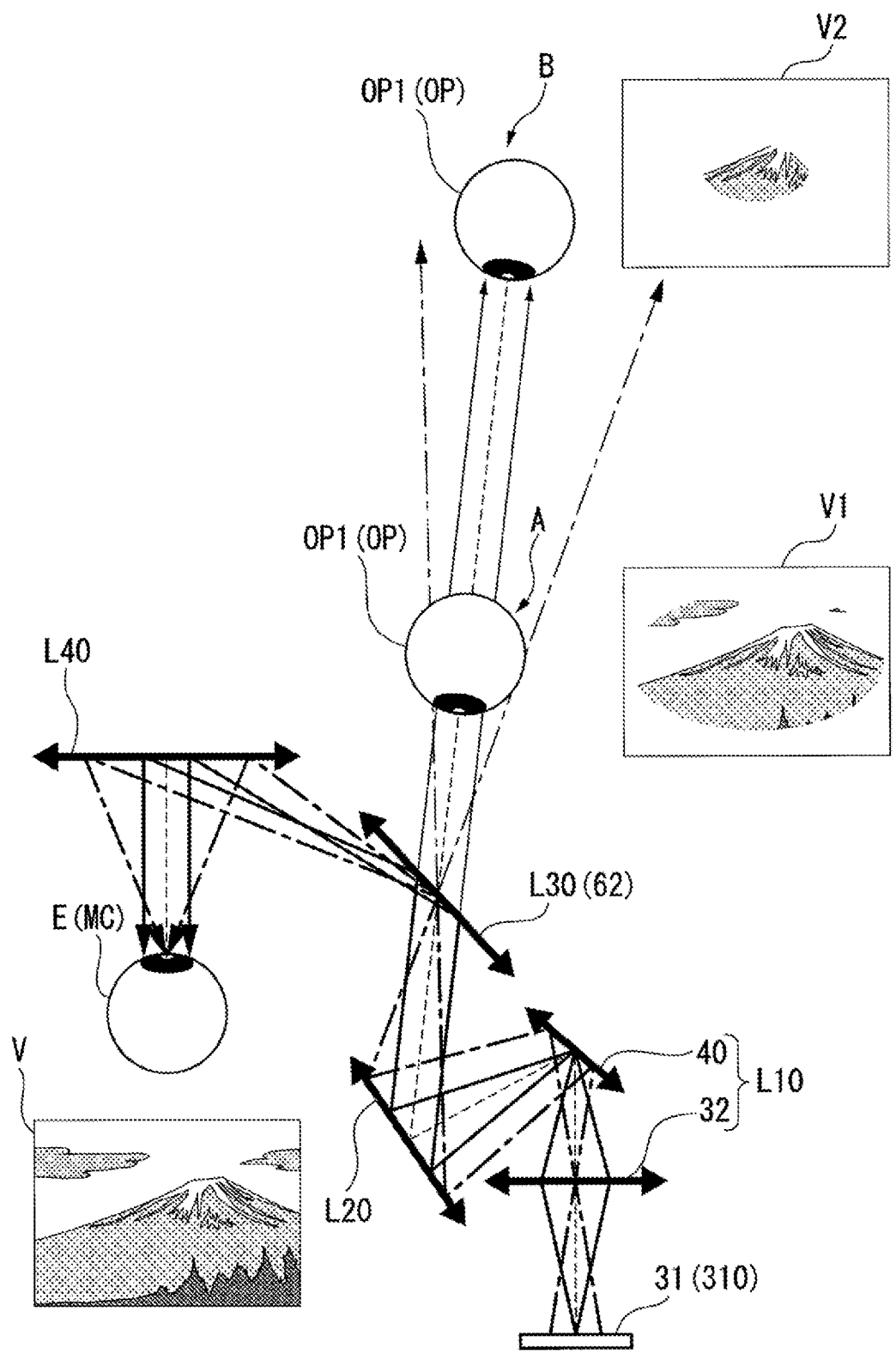
FIG. 10 is a diagram illustrating a situation when a third party attempts to see light rays transmitted through a half mirror.

FIG. 10 is a diagram illustrating a situation when the third party attempts to see light rays that have been transmitted through the half mirror 62. In FIG. 10, each of the optical units disposed along the optical axis is indicated by a thick arrow. In FIG. 10, the image actually visible to the eye E of the observer MC is indicated by a reference sign V.

As illustrated in FIG. 10, the imaging light emitted from the imaging light generating device 31 (the display panel 310) becomes substantially parallel light after passing through the second optical unit L20, and it can thus be said that if a third party OP is in a position at which light leaking from the half mirror 62 is incident on an eye OP1 of the third party OP, it is possible to verify the image.

When the third party OP is in a position A relatively close to the observer, the light rays emitted from the corners of the imaging light generating device 31 (the display panel 310) do not enter the eye OP1 of the third party OP. However the light rays emitted from the central portion of the imaging light generating device 31 (the display panel 310) are incident on the eye OP1, so the third party OP visually recognizes the image with the corners missing, as shown by an image V1.

Further, when the third party OP is in a region B relatively far from the observer, the light rays emitted from the central portion of the imaging light generating device 31 (the display panel 310) are not incident on the eye OP1, so the third party OP only visually recognizes a portion of the image near the center of a screen, as shown by an image V2. For example, even if the third party OP is separated by 60 cm from the half mirror 62, a state is obtained in which 7%, in the horizontal width direction, of the image viewed by the observer can be seen by the third party OP. In this case, when the third party OP moves his or her head and the eye OP1 up, down, left, and right, a position at which the light rays are incident on the eye OP1 changes, and thus the third party OP can infer the image visible to the observer, and it is possible to determine what the eye E of the observer MC is viewing.

Since the above-described situation conveys information or intentionally conveys information to the third party OP, confidential content that should be concealed by the observer MC is conveyed to the third party OP, which is not desirable for security reasons.

As illustrated in FIG. 3, the optical system 10 according to the present exemplary embodiment is provided with a polarization dependent film 63 on the reflection surface 62*a* of the half mirror 62. The polarization dependent film 63 has a different reflectance depending on a polarization direction of the light incident on the reflection surface 62*a* of the half mirror 62. The polarization dependent film 63 has optical properties, such as a reflectance of 100% of s-polarized light with respect to the reflection surface 62*a*, and a reflectance of 85% of p-polarized light with respect to the reflection surface 62*a*.

Here, in order for the optical system 10 according to the present exemplary embodiment to display a color image, the imaging light L0 includes the red, green, and blue wavelength bands. Therefore, the polarization dependent film 63 of the present exemplary embodiment is designed to be polarization dependent only on the wavelength bands that take into account the imaging light L0, or the imaging light L0 and the diffraction elements. Therefore, since the polarization dependent film 63 does not have polarization dependence with respect to light in wavelength bands that are not included in the imaging light L0, the polarization dependent film 63 does not detract from see-through properties with respect to the external light, by favorably transmitting light of the wavelength bands of the external light that are different from those of the imaging light L0. The transmittance of the external light in the polarization dependent film 63 according to the present exemplary embodiment is set to approximately 30%, for example.

As described above, the imaging light generating device 31 according to the present exemplary embodiment emits linearly polarized light as the imaging light L0. Specifically, the imaging light generating device 31 emits s-polarized light to the half mirror 62 as the imaging light L0.

Here, the imaging light L0 is emitted as s-polarized light, but since the imaging light L0 passes through the first optical unit L10 and the second optical unit L20 before it is incident on the half mirror 62, the polarization state is slightly disturbed in the process. The imaging light L0 includes other polarization components due to the disturbance in the polarization state described above, but is incident on the half mirror 62 as light in a polarization state primarily consisting of s-polarized light (light of a predetermined polarization state).

As described above, the polarization dependent film 63 provided on the reflection surface 62*a* of the half mirror 62 has the reflectance of 85% of p-polarized light (a first polarization), which is less than the reflectance of 100% of s-polarized light (a second polarization). In other words, since the reflectance of s-polarized light mainly composing the imaging light L0 is 100%, the imaging light L0 is reflected toward the fourth optic zone L40 without generally passing through the half mirror 62.

Therefore, according to the optical system 10 of the present exemplary embodiment, a proportion of the imaging light L0 that passes through the half mirror 62 can be reduced to less than 10%, for example. Thus, according to the optical system 10 of the present exemplary embodiment, it is possible to make it difficult for the third party OP to view the information that the observer is viewing.

According to the optical system 10 of the present exemplary embodiment, four conditions (Conditions 1, 2, 3 and 4) described below are satisfied.

Condition 1: Light rays emitted from one point of the imaging light generating device 31 form an image as one point on the retina E0.

Condition 2: An incident pupil of the optical system and a pupil of an eye are conjugate with each other.

Condition 3: The first diffraction element 50 and the second diffraction element 70 are appropriately disposed so as to compensate for peripheral wavelengths.

Condition 4: The first diffraction element 50 and the second diffraction element 70 are in the conjugate relationship or the substantially conjugate relationship.

More specifically, as can be understood from the solid lines La illustrated in FIG. 9, Condition 1, in which the light rays emitted from one point of the imaging light generating device 31 form an image as one point on the retina E0, is satisfied. Thus, the observer can visually recognize one pixel. Further, as can be understood from the solid lines La illustrated in FIG. 9, Condition 2, in which an incident pupil of the optical system 10 and a pupil E1 of an eye E are in a conjugate relationship (a conjugation of pupils), is satisfied. Thus, an entire region of the image generated by the image light generating device 31 can be visually recognized. Further, Condition 3, in which the first diffraction element 50 and the second diffraction element 70 are properly arranged so as to compensate for peripheral wavelengths, is satisfied. Thus, color aberration occurring in the second diffraction element 70 can be canceled by performing the wavelength compensation. Further, as can be understood from the long dashed lines Lc illustrated in FIG. 9, Condition 4, in which the first diffraction element 50 and the second diffraction element 70 are in the conjugate or the substantially conjugate relationship, is satisfied. Thus, in the first diffraction element 50 and the second diffraction element 70, it is possible to make the light rays incident on a location at which the interference fringes are the same and properly perform the wavelength compensation. As a result, a deterioration in the resolution of the imaging light can be suppressed.

As described above, according to the optical system 10 of the present exemplary embodiment, the imaging light L0 is emitted as linearly polarized light (s-polarized light), and the polarization dependent film 63 is provided on the reflection surface 62a of the half mirror 62, thus reducing the amount of imaging light L0 transmitted through the half mirror 62. In this way, by using the half mirror 62, it is possible to make it difficult for the third party OP to visually recognize the information being viewed by the observer, while securing the see-through properties with respect to the external light.

Note that in the present exemplary embodiment, an example has been given of a case in which the polarization dependent film 63, which emits linearly polarized light corresponding to s-polarized light, is emitted to the half mirror 62 from the imaging light generating device 31 as the imaging light L0, and the polarization dependent film 63 in which the reflectance of s-polarized light is higher than the reflectance of p-polarized light is provided on the reflection surface 62a of the half mirror 62. However, the present disclosure is not limited to this example. In other words, linearly polarized light corresponding to p-polarized light may be emitted to the half mirror 62 from the imaging light generating device 31 as the imaging light L0, and the polarization dependent film 63 may be used in which the reflectance of the p-polarized light is higher than the reflectance of the s-polarized light.

Second Exemplary Embodiment

Next, an optical system according to a second exemplary embodiment will be described. The difference between the present exemplary embodiment and the exemplary embodiment described above lies in a wave plate disposed on the optical path of the imaging light, and the configuration other than this is the same. Thus, any member that is the same as that of the exemplary embodiment described above will be assigned an identical reference sign, and a detailed description thereof will be omitted.

Figure 11:
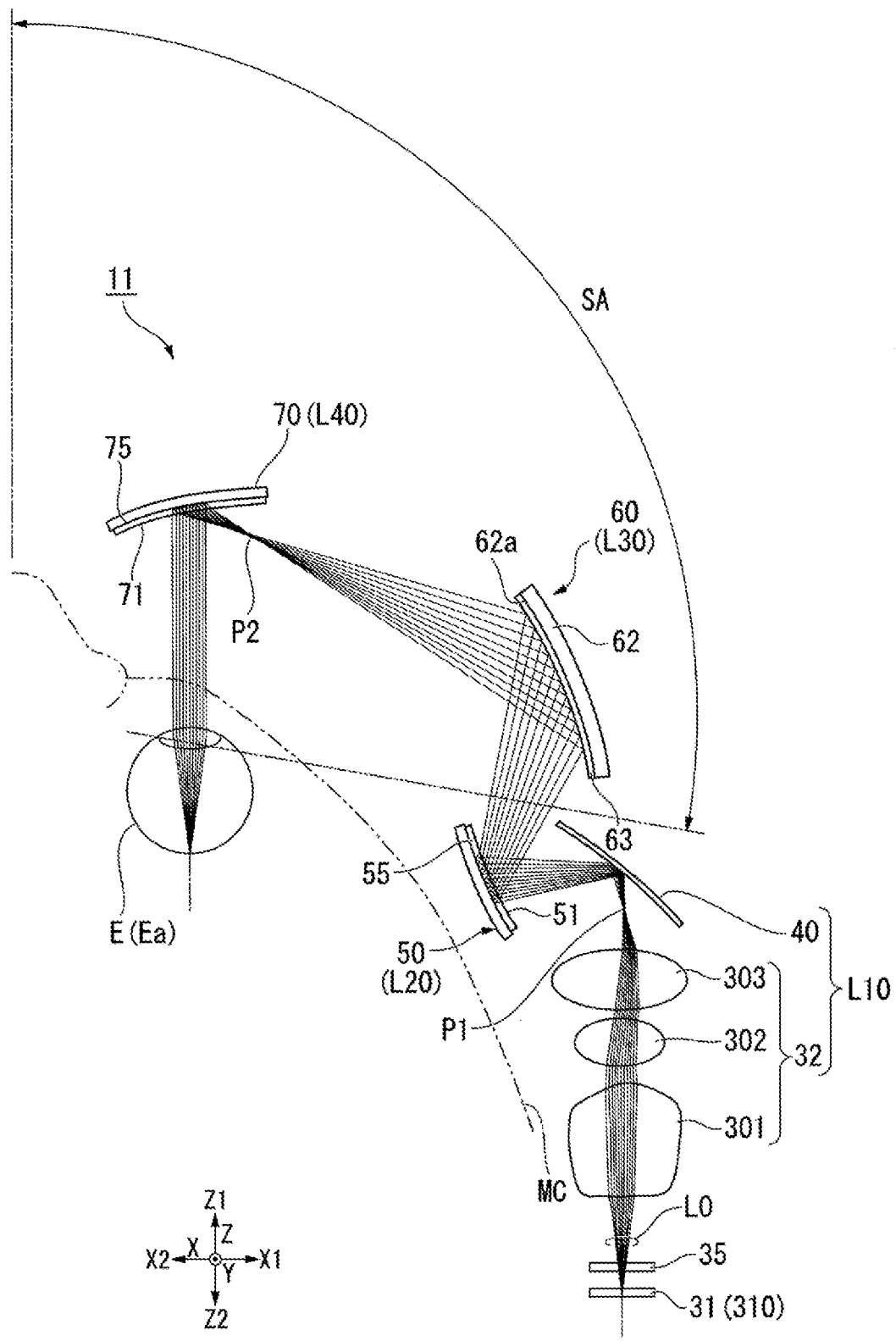
FIG. 11 is a diagram illustrating a configuration of an optical system according to a second exemplary embodiment.

FIG. 11 is a diagram illustrating a configuration of an optical system according to the present exemplary embodiment.

As illustrated in FIG. 11, an optical system 11 of the present exemplary embodiment is provided with the imaging light generating device 31, the first optical unit L10 having positive power, the second optical unit L20 having positive power, the third optical unit L30 having positive power, the fourth optical unit L40 having positive power, and a wave plate (polarization conversion member) 35.

The wave plate 35 is provided on the optical path of the imaging light L0 between the imaging light generating device 31 and the half mirror 62. In the present exemplary embodiment, the wave plate 35 is provided between the imaging light generating device 31 and the first optical unit L10. The wave plate 35 is configured by a half-wave plate.

The imaging light generating device 31 of the present exemplary embodiment emits p-polarized light to the half mirror 62 as the imaging light L0. By passing through the wave plate 35, the polarization state of the imaging light L0 emitted from the light generating device 31 is converted to s-polarized light (the second polarization) incident on the half mirror 62.

Therefore, according to the optical system 11 of the present exemplary embodiment, even in a case in which the imaging light L0 emitted from the imaging light generating device 31 is p-polarized light different from s-polarized light for which the polarization dependent film 63 has the relatively high reflectance, the imaging light L0 can be converted to s-polarized light by the wave plate 35 before being incident on the half mirror 62. Thus, in a similar manner to the optical system 10 of the first exemplary embodiment, it is possible to make it difficult for the third party OP to visually recognize the information being viewed by the observer, while securing the see-through properties with respect to the external light.

Note that in the present exemplary embodiment, the imaging light L0 emitted from the imaging light generating device 31 may be linearly polarized light other than p-polarized light, and in this case also, by appropriately setting the orientation of an optical axis of the wave plate 35 with respect to the imaging light L0, the imaging light L0 can be converted to s-polarized light.

Third Exemplary Embodiment

Next, an optical system according to a third exemplary embodiment will be described. The difference between the present exemplary embodiment and the exemplary embodiments described above lies in a polarization film disposed on the optical path of the imaging light, and the configuration other than this is the same. Thus, any member that is the same as that of the exemplary embodiment described above will be assigned an identical reference sign, and a detailed description thereof will be omitted.

Figure 12:
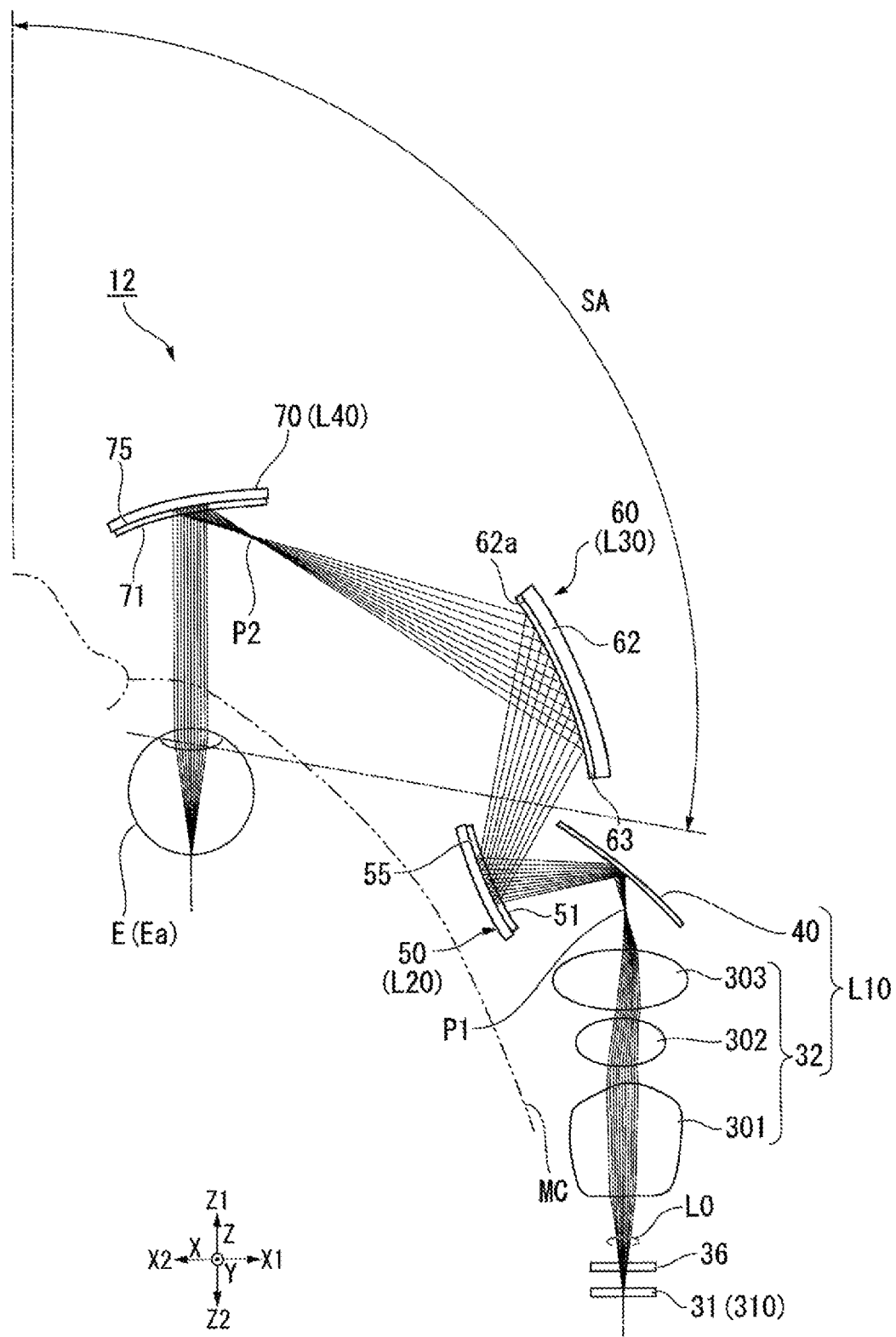
FIG. 12 is a diagram illustrating a configuration of an optical system according to a third exemplary embodiment.

FIG. 12 is a diagram illustrating a configuration of an optical system according to the present exemplary embodiment.

As illustrated in FIG. 12, an optical system 12 according to the present exemplary embodiment is provided with the imaging light generating device 31, the first optical unit L10 having positive power, the second optical unit L20 having positive power, the third optical unit L30 having positive power, the fourth optical unit L40 having positive power, and a polarization film (polarization conversion member) 36.

The polarization film 36 is provided on the optical path of the imaging light L0 between the imaging light generating device 31 and the half mirror 62. In the present exemplary embodiment, the polarization film 36 is provided between the imaging light generating device 31 and the first optical unit L10. The polarization film 36 is a film that only transmits light that vibrates in a predetermined direction, and has the same function as the polarization plate. Specifically, the polarization film 36 only transmits s-polarized light (the second polarization) incident on the half mirror 62, and absorbs light in other polarization directions.

The display panel 310 of the imaging light generating device 31 of the present exemplary embodiment is configured by an organic electroluminescent display element. According to this configuration, the compact imaging light generating device 31 capable of displaying a high-quality image can be provided.

Here, the imaging light L0 emitted from the display panel 310 configured by the organic electroluminescent display element is unpolarized. By passing through the polarization film 36, the polarization state of the imaging light L0 emitted from the imaging light generating device 31 is converted to s-polarized light (the second polarization) incident on the half mirror 62.

Therefore, according to the optical system 12 of the present exemplary embodiment, even in a case where the imaging light L0 emitted from the imaging light generating device 31 is unpolarized, the imaging light L0 can be converted to s-polarized light by the polarization film 36 before being incident on the half mirror 62. Thus, in a similar manner to the optical system 10 of the first exemplary embodiment, it is possible to make it difficult for the third party OP to visually recognize the information being viewed by the observer, while securing the see-through properties with respect to the external light.

Note that in the present exemplary embodiment, the polarization state of the imaging light L0 emitted from the imaging light generating device 31 may be circularly polarized light, elliptically polarized light, or linearly polarized light, in addition to unpolarized light. That is, according to the optical system 12 of the present exemplary embodiment, the imaging light L0 can be converted to s-polarized light by the polarization film 36 regardless of the polarization state of the imaging light L0 emitted from the imaging light generating device 31.

In addition, in the present exemplary embodiment, the polarization film 36 is disposed immediately after the imaging light generating device 31, but the polarization film 36 may be provided on the surface of each of the lenses 301 to 303 of the projection optical system 32 configuring the first optical unit L10, or on the surface of the mirror 40.

In addition, even in a case in which the imaging light L0 of linearly polarized light is emitted from the imaging light generating device 31, as in the first exemplary embodiment, there is a risk that the polarization state may be disturbed as a result of the polarization direction of the imaging light L0 rotating in the course of passing through the first optical unit L10 and the second optical unit L20. In this case, the polarization film 36 is provided between the second optical unit L20 and the third optical unit L30, and thus the imaging light L0 of s-polarized light can be caused to be incident on the half mirror 62.

Note that the polarization film 36 of the present exemplary embodiment and the wave plate 35 of the second exemplary embodiment may be disposed in combination with each other.

Fourth Exemplary Embodiment

Next, an optical system according to a fourth exemplary embodiment will be described. The difference between the present exemplary embodiment and the exemplary embodiments described above lies in the configuration of the half mirror, and the configuration other than this is the same. Thus, any member that is the same as that of the exemplary embodiment described above will be assigned an identical reference sign, and a detailed description thereof will be omitted.

Figure 13:
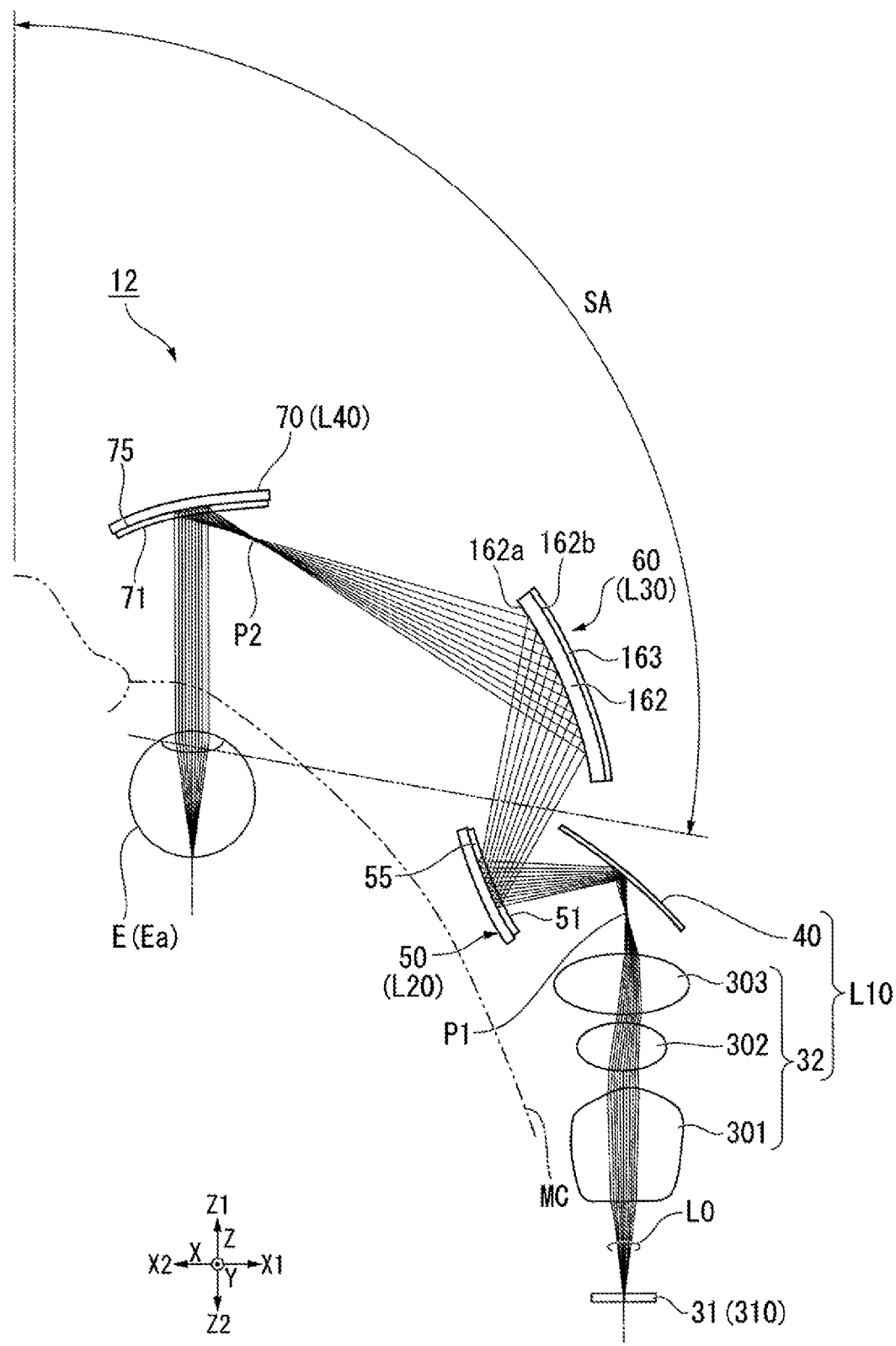
FIG. 13 is a diagram illustrating a configuration of main parts of an optical system according to a fourth exemplary embodiment.

FIG. 13 is a diagram illustrating a configuration of an optical system according to the present exemplary embodiment.

As illustrated in FIG. 13, an optical system 13 according to the present exemplary embodiment is provided with the imaging light generating device 31, the first optical unit L10 having positive power, the second optical unit L20 having positive power, the third optical unit L30 including a half mirror (optical member) 162 having positive power, and the fourth optical unit L40 having positive power. In the optical system 13 of the present exemplary embodiment, the half mirror 162 is supported by a frame member (not illustrated) so as to be positioned in a static visual field of the observer.

In the present exemplary embodiment, the half mirror (optical member) 162 has a reflection surface 162a that is more recessed at the center than at peripheral portions. The reflection surface 162a configures a semi-transparent mirror surface that reflects a portion of the imaging light L0 and transmits the remaining portion of the imaging light L0.

In the present exemplary embodiment, the imaging light generating device 31 emits s-polarized light to the half mirror 62 as the imaging light L0. Although the polarization state of the imaging light L0 is disturbed in the course of traveling until being incident on the half mirror 162, the imaging light L0 is incident on the half mirror 162 as light in a polarization state mainly consisting of s-polarized light. In other words, the imaging light L0 is incident on the half mirror 162 as light (light of a predetermined polarization state) in a polarization state that includes at least some s-polarized light (the first polarization).

The half mirror 162 of the present exemplary embodiment is provided with a polarization absorbing film 163 on an outer surface 162b located on the opposite side from the reflection surface 162a. The polarization absorbing film 163 is configured by a film that absorbs s-polarized light (the first polarization).

In the optical system 13 of the present exemplary embodiment, the imaging light L0 is reflected at a predetermined reflectance at the reflection surface 162a of the half mirror 162, but a portion of the imaging light L0 that passes through the reflection surface 162a is incident on the outer surface 162b. In the present exemplary embodiment, because the imaging light L0 is light in a polarization state mainly consisting of s-polarized light, the portion of the imaging light L0 that reaches the outer surface 162b is also light in a polarization state mainly consisting of s-polarized light. Since the polarization absorbing film 163 provided on the outer surface 162b has the characteristic of absorbing s-polarized light, as described above, the imaging light L0 that reaches the outer surface 162b is generally absorbed by the polarization absorbing film 163.

Therefore, according to the optical system 13 of the present exemplary embodiment, the imaging light L0 of the predetermined polarization state consisting mainly of s-polarized light is caused to be incident on the half mirror 162, and the polarization absorbing film 163 that absorbs the s-polarized light is also provided on the outer surface 162b of the half mirror 162. As a result, the amount of the imaging light L0 that passes through the half mirror 162 and is emitted to the outside can be reduced. In this way, it is possible to make it difficult for the third party OP to visually recognize the information being viewed by the observer, while securing the see-through properties with respect to the external light.

Figure 14:
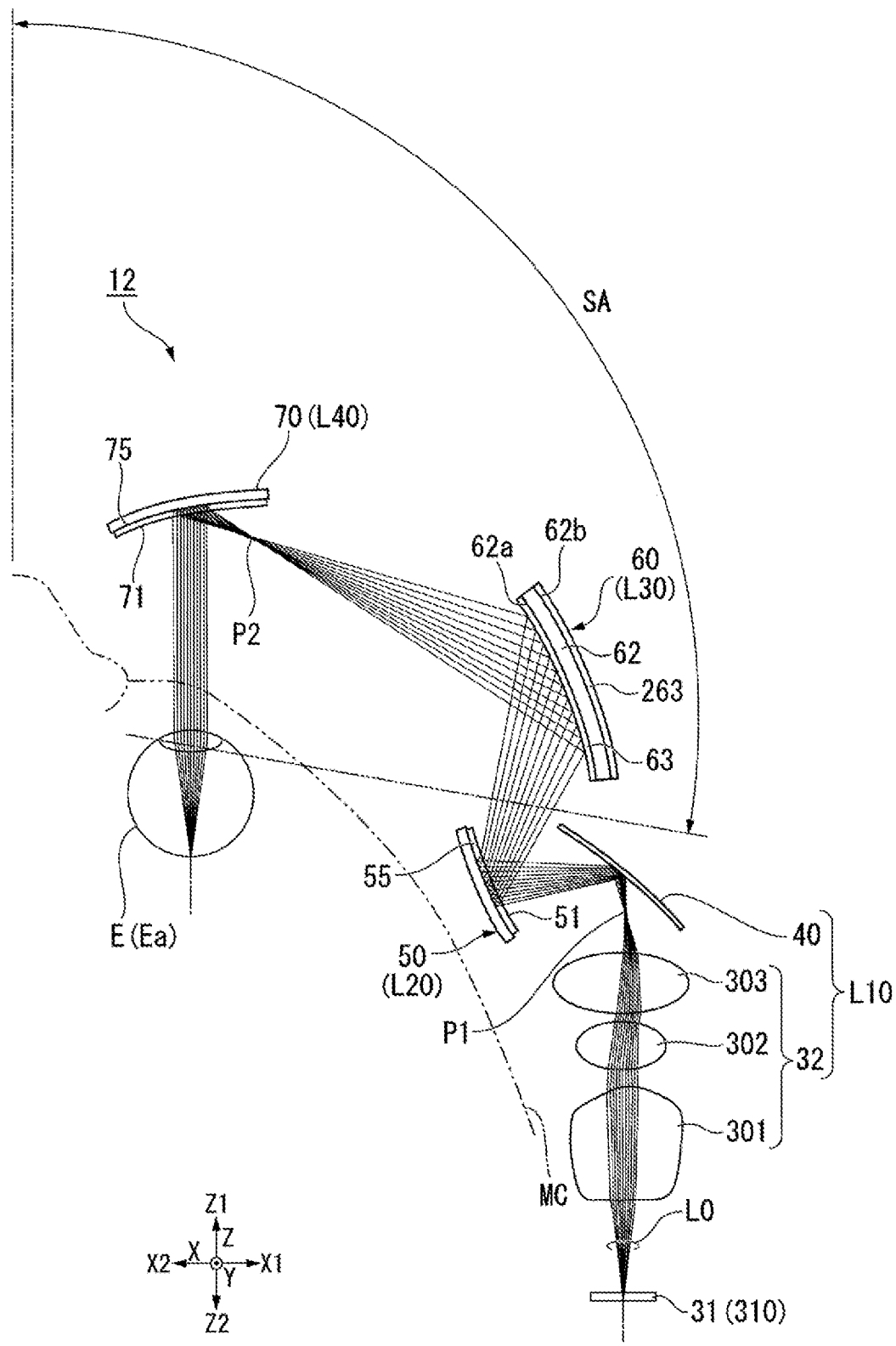
FIG. 14 is a diagram illustrating a configuration in which the first exemplary embodiment and the fourth exemplary embodiment are combined.

Note that the configuration of the present exemplary embodiment may be combined with the half mirror 62 of the first exemplary embodiment. In other words, as illustrated in FIG. 14, a polarization absorbing film 263 may be provided on an outer surface 62b on the opposite side from the reflection surface 62a of the half mirror 62 of the first exemplary embodiment. In this case, the polarization absorbing film 263 has a characteristic of absorbing p-polarized light (the first polarization) for which the reflectance in the polarization dependent film 63 is relatively low. The s-polarized light included in the imaging light L0 is reflected by the polarization dependent film 63, but the p-polarized light component included in the imaging light L0 may pass through the polarization dependent film 63 and reach the outer surface 62b. The imaging light L0 of the p-polarized light transmitted through the polarization dependent film 63 is absorbed by the polarization absorbing film 263, and thus is not emitted to the outside from the outer surface 62b of the half mirror 62.

Accordingly, by combining the polarization absorbing film 263 with the half mirror 62 of the first exemplary embodiment, the imaging light L0 emitted to the outside of the half mirror 62 can be further reduced.

Figure 15:
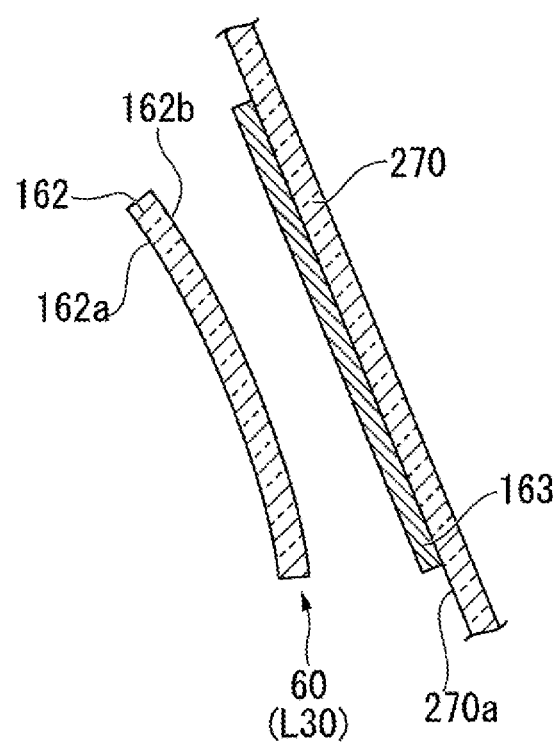
FIG. 15 is a diagram illustrating a configuration in which a polarization absorbing film is provided on a cover member.

In the optical system 13 of the present exemplary embodiment, a cover member that covers at least the third optical unit L30 may be provided. In this case, as illustrated in FIG. 15, the polarization absorbing film 163 may be provided on an inner surface 270a of a cover member 270 at a position facing the outer surface 162b of the half mirror 162. In this way, s-polarized light included in the imaging light L0 emitted from the outer surface 162b of the half mirror 162 can be absorbed by the polarization absorbing film 163 provided on the inner surface 270a of the cover member 270, and thus the amount of the imaging light L0 emitted to the outside can be reduced, in the same manner as in the optical system 13 of the present exemplary embodiment.

Fifth Exemplary Embodiment

Next, an optical system according to a fifth exemplary embodiment will be described.

In the exemplary embodiments described above, the imaging light L0 is not incident on the second diffraction element 70 configuring the fourth optical unit L40 as parallel light, and thus the imaging light L0 is less visible from the outside, in comparison to the half mirror 62 configuring the third optical unit L30. However, for example, if the third party consciously views the image, the imaging light L0 incident on the second diffraction element 70 may be visible to the third party.

The present exemplary embodiment relates to a configuration that suppresses emission of the imaging light L0 to the outside from the second diffraction element 70 of the fourth optical unit L40. Note that any member that is the same as that of the exemplary embodiments described above will be assigned an identical reference sign, and a detailed description thereof will be omitted.

Figure 16:
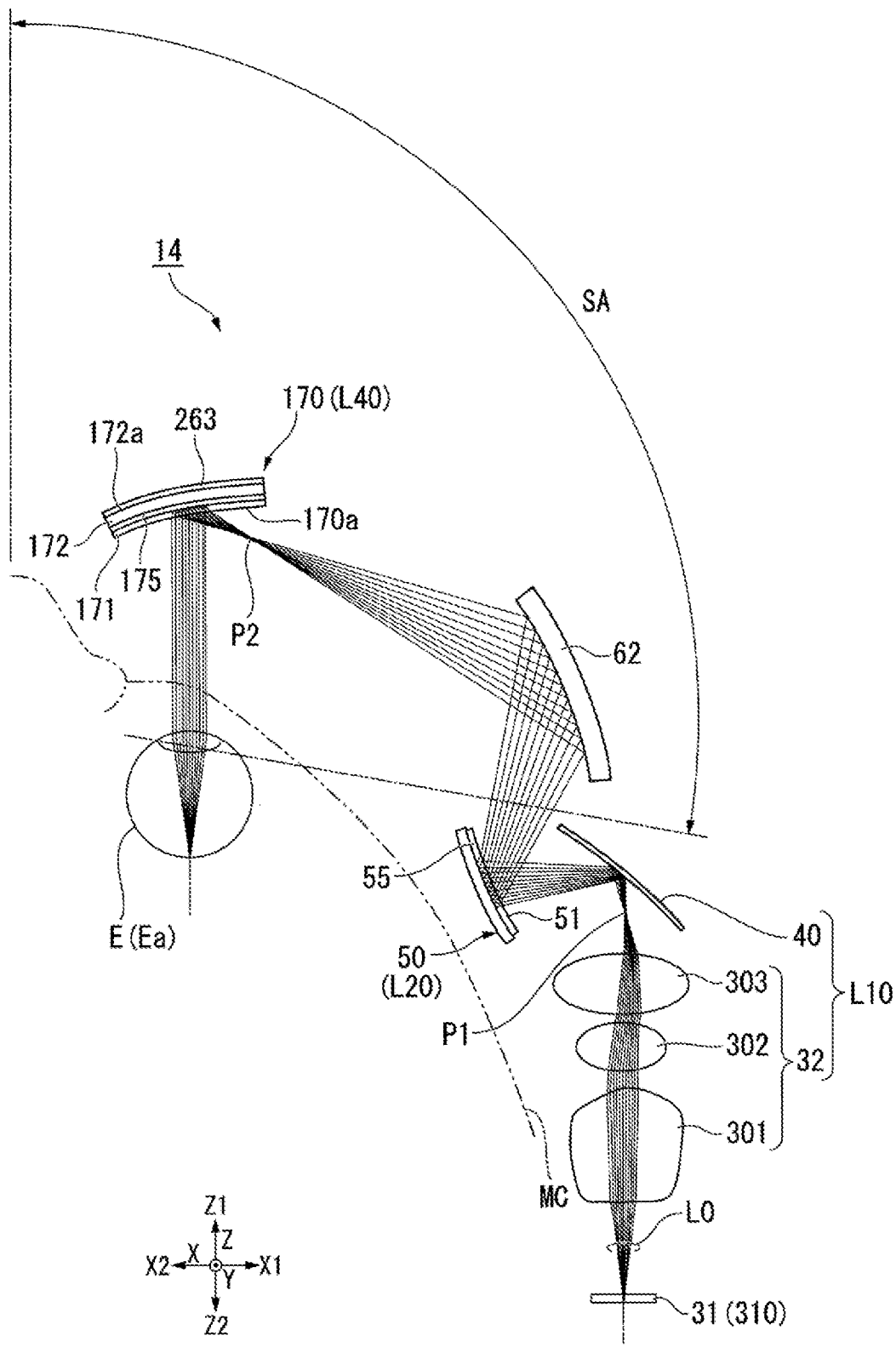
FIG. 16 is a diagram illustrating a configuration of main parts of an optical system according to a fifth exemplary embodiment.

FIG. 16 is a diagram illustrating a configuration of main parts of an optical system according to the present exemplary embodiment.

As illustrated in FIG. 16, an optical system 14 of the present exemplary embodiment is provided with the imaging light generating device 31, the first optical unit L10 having positive power, the second optical unit L20 having positive power, the third optical unit L30 having positive power, and the fourth optical unit L40 including a reflective second diffraction element 170 and having positive power.

In the present exemplary embodiment, the imaging light generating device 31 emits s-polarized light towards an incident surface 170a of the second diffraction element 170, as the imaging light L0. The polarization state of the imaging light L0 is slightly disturbed in the course of traveling until being incident on the second diffraction element 170, but the imaging light L0 is incident on the second diffraction element 170 as light in a polarization state mainly consisting of s-polarized light. In other words, the imaging light L0 is incident on the second diffraction element 170 as light (light of the predetermined polarization state) in a polarization state that includes at least some s-polarized light (the first polarization).

The second diffraction element (optical member) 170 of the present exemplary embodiment has a configuration in which a reflective volume holographic layer 175 is sandwiched between a first transmissive substrate 171 and a second transmissive substrate 172. The second diffraction element 170 is provided with the polarization absorbing film 263 on a surface 172a of the second transmissive substrate 172 provided on the opposite side from the incident surface 170a that forms a concave surface. The polarization absorbing film 263 is configured by a film that absorbs s-polarized light (the first polarization).

In the optical system 14 of the present exemplary embodiment, the imaging light L0 is diffracted by the reflective volume holographic layer 175 of the second diffraction element 170 to deflect the direction of travel, but a portion of the imaging light L0 may be transmitted through the reflective volume holographic layer 175 and be incident on the second transmissive substrate 172.

In the present exemplary embodiment, because the imaging light L0 is light in the polarization state mainly consisting of s-polarized light, the portion of the imaging light L0 that reaches the surface 172a of the second transmissive substrate 172 is also light in the polarization state mainly consisting of s-polarized light. Because the polarization absorbing film 263 provided on the surface 172a of the second transmissive substrate 172 has the characteristic of absorbing s-polarized light, as described above, the imaging light L0 that reaches the surface 172a of the second transmissive substrate 172 is generally absorbed by the polarization absorbing film 263.

Therefore, according to the optical system 14 of the present exemplary embodiment, the imaging light L0 of the predetermined polarization state consisting mainly of s-polarized light is caused to be incident on the second diffraction element 170, and the polarization absorbing film 263 that absorbs s-polarized light is also provided on the surface 172*a* of the second transmissive substrate 172 on the opposite side from the incident surface 170*a* of the second diffraction element 170. As a result, the amount of the imaging light L0 that passes through the second diffraction element 170 and is emitted to the outside can be reduced. In this way, by reducing leakage of the imaging light L0 from the second diffraction element 170 to the outside, it is possible to make it difficult for the third party OP to visually recognize the information being viewed by the observer, while securing the see-through properties with respect to the external light.

Figure 17:
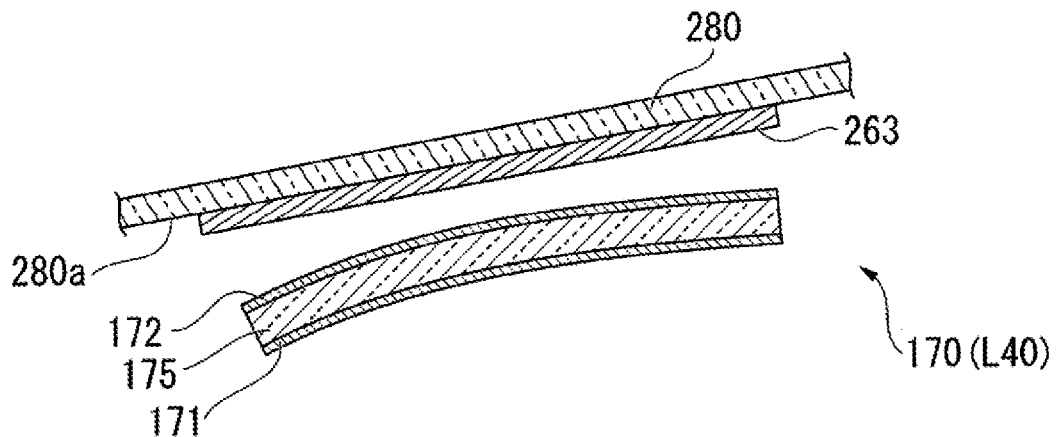
FIG. 17 is a diagram illustrating a configuration in which a polarization absorbing film is provided on a cover member.

Note that, in the optical system 14 of the present exemplary embodiment, a cover member that covers at least the fourth optical unit L40 may be provided. In this case, as illustrated in FIG. 17, the polarization absorbing film 263 may be provided on an inner surface 280*a* of a cover member 280 at a position facing the surface 172*a* of the second transmissive substrate 172 that forms the outer surface of the second diffraction element 170. In this way, the s-polarized light contained in the imaging light L0 emitted from the second diffraction element 170 is absorbed by the polarization absorbing film 263 provided on the inner surface 280*a* of the cover member 280, and thus the amount of the imaging light L0 emitted to the outside can be reduced.

First Modified Example

Figure 18:
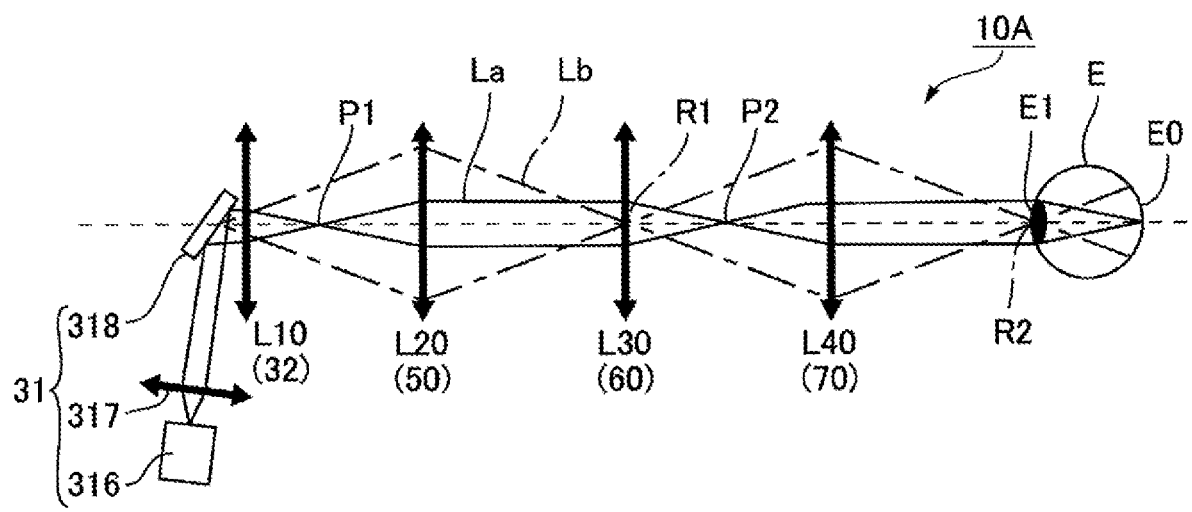
FIG. 18 is a diagram illustrating light rays in an optical system according to a first modified example.

FIG. 18 is a diagram of light rays of an optical system 10A according to a first modified example. In FIG. 18, each of the optical units disposed along the optical axis is indicated by a thick arrow.

As illustrated in FIG. 18, similarly to the configuration of the first exemplary embodiment described with reference to FIG. 9, the optical system 10A of the present modified example is provided with the first optical unit L10 (the projection optical system 32) having positive power, the second optical unit L20, the third optical unit L30 (the light guiding system 60), and the fourth optical unit L40. The imaging light generating device 31 of the present modified example includes a laser light source 316, a collimating lens 317, and a micro-mirror device 318, and can generate the imaging light L0 by scanning s-polarized laser light emitted from the laser light source 316 as a result of driving the micro-mirror device 318.

In the optical system 10A of the present modified example, by providing the polarization dependent film 63 on the half mirror 62 that configures the light guiding system 60, it is possible to make it difficult for the third party to visually recognize the information being viewed by the observer, while securing the see-through properties with respect to the external light.

Note that the configuration of the other exemplary embodiments and the optical system 10A of the present modified example may be combined.

Second Modified Example

Figure 19:
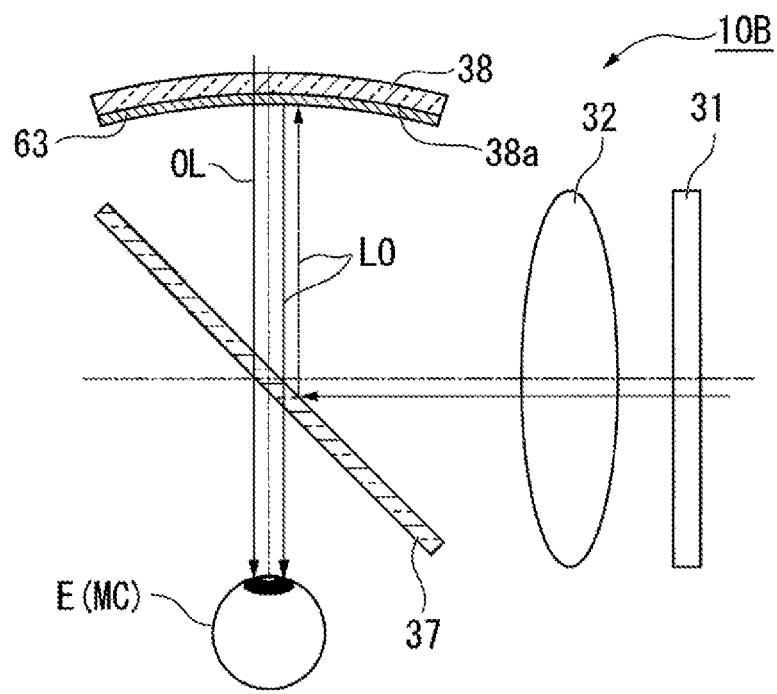
FIG. 19 is a diagram illustrating a configuration of main parts of an optical system according to a second modified example.

FIG. 19 is a diagram illustrating a configuration of main parts of an optical system 10B according to a second modified example.

As illustrated in FIG. 19, the optical system 10B of the present modified example includes the imaging light generating device 31, the projection optical system 32, a first half mirror 37, and a second half mirror 38.

In the optical system 10B of the present modified example, the imaging light L0 emitted from the imaging light generating device 31 is reflected by the first half mirror 37, is incident on the second half mirror 38, is reflected by the second half mirror 38, and is then transmitted through the first half mirror 37 and is incident on the eye E of the observer. In addition, since the first half mirror 37 and the second half mirror 38 disposed in front of the eye E of the observer are transmissive, external light OL is transmitted through the first half mirror 37 and the second half mirror 38 and is guided to the eye E of the observer MC. In the optical system 10B of the present exemplary embodiment, the second half mirror 38 is supported by a frame member (not illustrated) so as to be positioned in the static visual field of the observer.

In the optical system 10B of the present exemplary embodiment, there is a risk that the imaging light L0 emitted from the imaging light generating device 31 (the display panel 310) may be transmitted through the second half mirror 38 and emitted to the outside, and may become visible to the third party. In the optical system 10B of the present modified example, by providing the polarization dependent film 63 on a reflection surface 38*a* forming a concave surface of the second half mirror 38, the same effects as those of the optical system 10 according to the first exemplary embodiment can be achieved.

In other words, according to the optical system 10B of the present modified example, by emitting the imaging light L0 as linearly polarized light, and providing the polarization dependent film 63 on the reflection surface 38*a* of the second half mirror 38, the amount of the imaging light L0 transmitted through the second half mirror 38 can be reduced. In this way, it is possible to suppress the information being viewed by the observer from being visually recognized by the third party via the second half mirror 38, while securing the see-through properties of the second half mirror 38 with respect to the external light OL.

Third Modified Example

Figure 20:
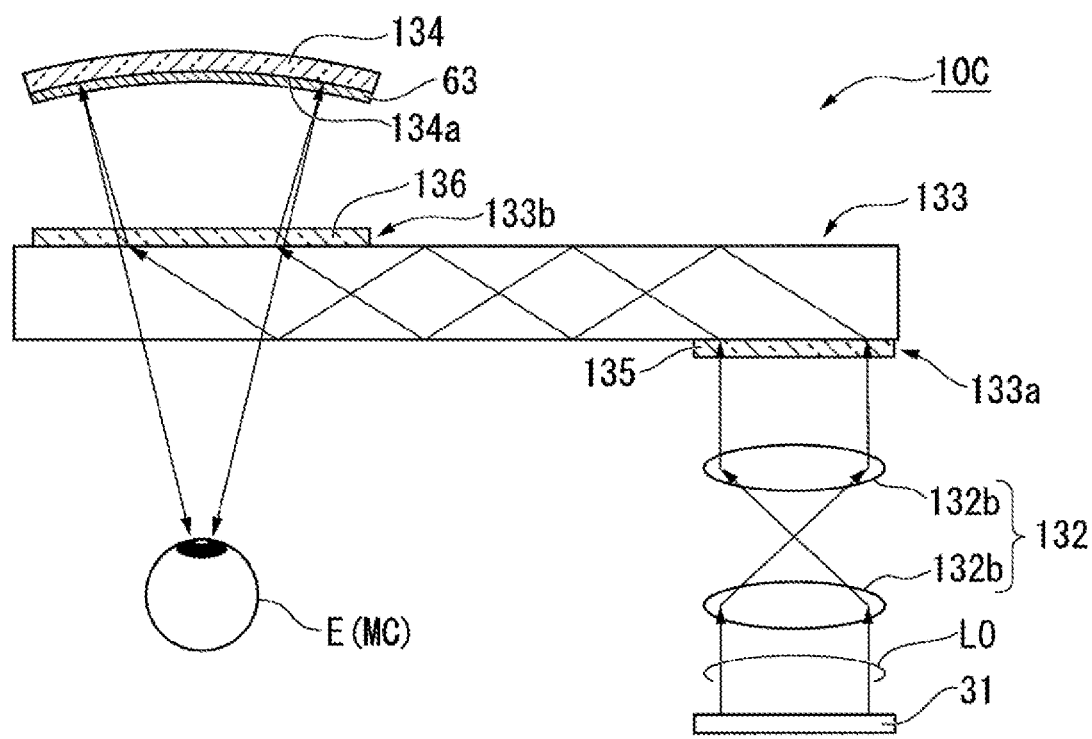
FIG. 20 is a diagram illustrating a configuration of main parts of the optical system according to the second modified example.

FIG. 20 is a diagram illustrating a configuration of main parts of an optical system 10C according to a third modified example.

As illustrated in FIG. 20, the optical system 10C of the present modified example includes the imaging light generating device 31, a projection optical system 132, a light guide 133, and a half mirror 134.

The projection optical system 132 includes a first lens 132*a* and a second lens 132*b*, collimates the imaging light L0 emitted from the imaging light generating device 31, and causes the imaging light L0 to be incident on the light guide 133. The light guide 133 includes a diffraction element 135 provided on a light incidence part 133*a*, and a light diffusing part 136 provided on a light emitting part 133*b*. The half mirror 134 reflects the imaging light L0 emitted from the light guide 133 to the eye E of the observer.

In the optical system 10C of the present modified example, the imaging light L0 emitted from the imaging light generating device 31 is diffracted by the diffraction element 135 provided on the light incidence part 133*a* of the light guide unit 133, and is incident on the light guide unit 133. The imaging light L0 is propagated by total internal reflection inside the light guide unit 133, and is emitted to the outside from the light diffusing part 136 provided on the light emitting part 133*b*. The imaging light L0 emitted to the outside from the light emitting part 133*b* is reflected by the half mirror 134, passes through the light guide 133, and is condensed and incident on the eye E of the observer MC.

In addition, since the light guide 133 and the half mirror 134 disposed in front of the eye E of the observer are transmissive, the external light OL is transmitted through the half mirror 134 and the light guide 133 and is guided to the eye E of the observer. In the optical system 10C of the present exemplary embodiment, the half mirror 134 is supported by a frame member (not illustrated) so as to be positioned in the static visual field of the observer MC.

In the optical system 10C of the present exemplary embodiment, the imaging light L0 emitted from the imaging light generating device 31 (the display panel 310) may be transmitted through the half mirror 134 and emitted to the outside, and may become visible to the third party. By providing the polarization dependent film 63 on a reflection surface 134*a* forming a concave surface of the half mirror 134, the optical system 10C of the present modified example can achieve the same effects as those of the optical system 10 according to the first exemplary embodiment. In other words, according to the optical system 10C of the present modified example, by emitting the imaging light L0 as linearly polarized light, and providing the polarization dependent film 63 on the reflection surface 134*a* of the half mirror 134, the amount of the imaging light L0 transmitted through the half mirror 134 can be reduced. In this way, it is possible to suppress the information being viewed by the observer from being visually recognized by the third party via the half mirror 134, while securing the see-through properties of the half mirror 134 with respect to the external light OL.

In the exemplary embodiments described above, the polarization conversion member is exemplified by the wave plate 35 or the polarization film 36, but the polarization conversion member may be configuring by a polarizing membrane.

In the above-described first exemplary embodiment, an example is given of a configuration in which the frame 91 (see FIG. 1) supports the half mirror 62, but the half mirror 62 and the frame 91 may be formed integrally. In this case, the half mirror 62 is provided with a holding structure that holds the temples 92*a* and 92*b* (see FIG. 1). In addition, the frame 91, the temples 92*a* and 92*b*, and the half mirror 62 may be formed integrally by one transparent member.

The configuration of the third exemplary embodiment and the configuration of the fourth exemplary embodiment may also be combined. That is, an optical system provided with the third optical unit L30 including the half mirror 162 having positive power, and with the fourth optical unit L40 having positive power and including the reflective second diffraction element 170, may be employed.

The optical system of the present disclosure can also be applied to a configuration that scans laser light emitted from a laser light source, as illustrated in FIG. 18, and generates imaging light towards an optical member configured by a diffraction element or a half mirror disposed in front of the eye of the observer. In this case, by providing the polarization dependent film 63 on the diffraction element or the half mirror, it is possible to make it difficult for the third party to visually recognize the information of the image light being viewed by the observer, while securing the see-through properties with respect to the external light.

Application to Other Display Devices

In the exemplary embodiments described above, the head-mounted display device 100 is exemplified, but the present disclosure may be applied to a head-up display, a handheld display, a projector optical system, and the like.

What is claimed is:

1. A head-mounted display comprising:
   an imaging light generating device configured to emit imaging light;
   a half mirror configured to reflect the imaging light and transmit external light, the half mirror having a curved shape with a center portion more recessed than peripheral portions and configured to reflect different polarizations with different reflectance;
   a first optical unit having positive power;
   a second optical unit including a reflective first diffraction element and having positive power;
   a third optical unit having positive power; and
   a fourth optical unit including a reflective second diffraction element and having positive power,
   with the first to fourth optical units being provided along an optical path of the imaging light emitted from the imaging light generating device, wherein
   the third optical unit includes the half mirror,
   the imaging light is incident on the half mirror as light of a predetermined polarization state, and
   with respect to the light of the predetermined polarization state, reflectance of a first polarization by the half mirror is lower than reflectance of a second polarization by the half mirror.

2. The head-mounted display according to claim 1, comprising a polarization conversion member provided on an optical path of the imaging light between the imaging light generating device and the half mirror, and configured to convert a polarization state of the imaging light to the second polarization.

3. The head-mounted display according to claim 1, wherein
   the polarization conversion member is any of a wave plate, a polarization film, and a polarization membrane.

4. The head-mounted display according to claim 1, comprising a polarization absorbing film provided on an opposite side of the half mirror from a reflection surface thereof, and configured to absorb the first polarization.

5. The head-mounted display according to claim 1, comprising a frame configured to support the half mirror, wherein
   the frame supports the half mirror to be in a position in a static visual field of an observer observing the imaging light.

6. A head-mounted display comprising:
   an imaging light generating device configured to emit imaging light;
   at least one optical member configured to deflect a traveling direction of the imaging light and to transmit external light, the optical member having a curved shape with a center portion more recessed than peripheral portions and configured to reflect different polarizations with different reflectance;
   a polarization absorbing film provided on an opposite side of the optical member from a light incident surface thereof, and configured to absorb a first polarization;
   a first optical unit having positive power;
   a second optical unit including a reflective first diffraction element and having positive power;
   a third optical unit having positive power; and
   a fourth optical unit including a reflective second diffraction element and having positive power, with the first to fourth optical units being provided along an optical of the imaging light emitted from the imaging light generating device, wherein at least one of the third optical unit and the fourth optical unit includes the optical member, and the imaging light is incident on the optical member as light of a predetermined polarization state including at least the first polarization.

7. The head-mounted display according to claim 6, comprising a frame configured to support the optical member, wherein the frame supports the optical member to be in a position in a static visual field of an observer observing the imaging light.

* * * * *